US007005209B1

(12) United States Patent
Gaines et al.

(10) Patent No.: US 7,005,209 B1
(45) Date of Patent: Feb. 28, 2006

(54) FUEL CELL STACK ASSEMBLY

(75) Inventors: Michael G. Gaines, Humble, TX (US); George R. King, The Woodlands, TX (US); Kenneth J. Schmitt, Spring, TX (US)

(73) Assignee: The Texas A&M University System, College Station, TX (US)

( * ) Notice: Subject to any disclaimer, the term of this patent is extended or adjusted under 35 U.S.C. 154(b) by 270 days.

(21) Appl. No.: 10/264,578

(22) Filed: Oct. 4, 2002

(51) Int. Cl.
*H01M 2/18* (2006.01)
*H01M 8/10* (2006.01)

(52) U.S. Cl. .......................... 429/38; 429/39; 429/35; 429/37; 429/26

(58) Field of Classification Search ............ 429/34–39, 429/44, 26, 30
See application file for complete search history.

(56) References Cited

U.S. PATENT DOCUMENTS

| | | | |
|---|---|---|---|
| 3,616,841 A | 11/1971 | Walz ............................ 164/34 |
| 4,058,482 A | 11/1977 | Baris et al. .............. 252/425.3 |
| 4,125,676 A | 11/1978 | Maricle et al. ................ 429/38 |
| 4,175,165 A | 11/1979 | Adlhart ........................ 429/30 |
| 4,496,437 A | 1/1985 | McIntyre et al. ............. 204/24 |
| H16 H | 1/1986 | Kaun ........................... 429/29 |
| 4,818,741 A | 4/1989 | Herscovici .................. 502/101 |
| 4,876,115 A | 10/1989 | Raistrick .................... 427/115 |
| 4,910,099 A | 3/1990 | Gottesfeld ................... 429/13 |
| 5,079,105 A | 1/1992 | Bossel ......................... 429/19 |
| 5,364,712 A | 11/1994 | Townsend .................... 429/42 |
| 5,366,819 A | 11/1994 | Hartvigsen et al. ........... 429/17 |
| 5,418,079 A | 5/1995 | Diethelm ...................... 429/26 |
| 5,482,792 A | 1/1996 | Faita et al. ................... 429/30 |
| 5,565,072 A | 10/1996 | Faita et al. ................. 204/256 |
| 5,578,388 A | 11/1996 | Faita et al. ................... 429/30 |
| 5,589,285 A | 12/1996 | Cable et al. ................... 429/13 |
| 5,763,114 A | 6/1998 | Khandkar et al. ............. 429/20 |
| 5,853,910 A | 12/1998 | Tomioka et al. ............... 429/17 |
| 5,879,826 A | 3/1999 | Lehman et al. ................ 429/13 |
| 6,007,932 A | 12/1999 | Steyn .......................... 429/31 |
| 6,022,634 A | 2/2000 | Ramunni et al. .............. 429/34 |
| 6,051,117 A | 4/2000 | Novak et al. ................ 204/252 |
| 6,140,266 A | 10/2000 | Corrigan et al. ............ 502/439 |
| 6,146,780 A | 11/2000 | Cisar et al. ................... 429/34 |
| 6,232,010 B1 | 5/2001 | Cisar et al. ................... 429/40 |
| 6,280,870 B1 | 8/2001 | Eisman et al. ................ 429/34 |
| 6,284,399 B1 | 9/2001 | Oko et al. ..................... 429/19 |
| 6,372,376 B1 | 4/2002 | Fronk et al. .................. 429/41 |
| 6,387,556 B1 | 5/2002 | Fuglevand et al. ........... 429/22 |
| 6,387,557 B1 | 5/2002 | Krasij et al. .................. 429/32 |
| 6,399,234 B1 | 6/2002 | Bonk et al. ................... 429/32 |
| 6,403,249 B1 | 6/2002 | Reid ............................ 429/39 |
| 6,410,180 B1 | 6/2002 | Cisar et al. ................... 429/41 |
| 6,413,664 B1 | 7/2002 | Wilkinson et al. ............ 429/34 |
| 6,531,238 B1 * | 3/2003 | King ............................ 429/38 |
| 6,828,054 B1 * | 12/2004 | Appleby et al. .............. 429/34 |
| 2002/0068208 A1 | 6/2002 | Dristy et al. .................. 429/34 |

FOREIGN PATENT DOCUMENTS

| | | |
|---|---|---|
| EP | 0 709 907 A1 | 5/1996 |
| JP | 05041239 | 6/1993 |
| JP | 63232275 | 9/1998 |
| WO | WO 96/20509 A1 | 7/1996 |
| WO | WO 97/24474 A1 | 7/1997 |
| WO | WO 00/72373 A1 | 11/2000 |

* cited by examiner

*Primary Examiner*—Tracy Dove
(74) *Attorney, Agent, or Firm*—Baker Botts L.L.P.

(57) ABSTRACT

Disclosed herein is a novel fuel cell stack assembly. In one embodiment, the stacks of the present invention comprise: a first and a second end plate; a plurality of fuel cells interposed between the first and second end plates, at least one of the fuel cells having a unitized MEA assembly and/or a compound flow field; a means to separate neighboring fuel cell components; and a compression means.

36 Claims, 16 Drawing Sheets

FUEL CELL STACK ASSEMBLY

BACKGROUND OF THE INVENTION

The present invention relates in general to the field of proton exchange membrane ("PEM") fuel cell systems, and more particularly, to an improved PEM fuel cell stack having improved fuel cells.

Shown in FIG. 1 is a representation of a typical PEM fuel cell assembly. Known fuel cell constructions include a proton exchange membrane disposed between respective anode and cathode plates. As shown in FIG. 1, a typical PEM fuel cell comprises an MEA 102, which itself usually consists of five layers: a membrane 120, two catalytic active layers 116 and 118, and two gas dispersion layers 104 and 108. A anode flow field/separator plate is illustrated at 106; a cathode flow field/separator plate is illustrated at 110.

An electrochemical reaction takes place at and between the anode plate and the cathode plate, with attendant formation of a product of the reaction between the fuel and oxygen, release of thermal energy, creation of an electrical potential difference between the plates, with the thus generated electric power usually constituting the useful output of the fuel cell. The general principles of the electrochemical reaction in and operation of such fuel cells are so well-known that they need not be discussed here in great detail.

FIG. 2 is another view of the components of a conventional PEM fuel cell assembly extracted from a conventional fuel cell stack. Anode flow field/separator plate 106 is located on the anode side of MEA 102; cathode flow field/separator plate 110 is located on the cathode side of MEA 102. Illustrated in both plate 106 and plate 110 is the serpentine channel used to inter alia facilitate gas dispersion to the MEA and water management in the fuel cell. The flow field/separator plates in a typical fuel cell assembly are either monopolar or bipolar flow field/separator plates. In a monopolar design in a stack assembly, the anode flow field and cathode flow field of neighboring fuel cells do not physically share a common separator plate, whereas in a bipolar design, the anode of one fuel cell and the cathode of a neighboring fuel cell are connected to a common separator plate or are otherwise an integral component. Plates 106 and 110 as depicted are bipolar plates (i.e., anode of one fuel cell and the cathode of a neighboring fuel cell are integral to a common separator plate).

In alternative designs of conventional fuel cell stacks, the bipolar plate may be an assembly of two monopolar flow field/separator plates, allowing for water cooling or heat management between the two plates, if desired. This construction incorporating water cooling interrupts a true bipolar plate construction but may be still referred to by those skilled in the art as a "bipolar construction," although it is actually two monopolar plates arranged in an assembly including a heat management means.

To increase the amount of power produced, individual fuel cells are stacked to form fuel cell stacks. FIG. 3 illustrates a conventional fuel cell stack assembly. Shown in FIG. 3 are end plates 302; conventional bipolar flow field/ separator plates 106 and 110; MEA 102; and a threaded-fastener stack compression means 304 (which here includes threaded fasteners and bolts). End plates 302 in combination with the compression means 304 serve to inter alia secure the fuel cells within the stack assembly and distribute the forces transmitted to the stack by the compression means. Conventional bipolar flow field/separator plates 106 and 110 serve to transport the reactant gases to MEA 102 for the electrochemical reaction. Although not illustrated in FIG. 3, heat exchange plates or other mechanisms to manage heat within the stack may be a part of or located between the flow field/separator plates of neighboring fuel cells.

In conventional fuel cell stacks, a multitude of problems may arise. For example, one problem associated with stacks utilizing conventional serpentine-channeled bipolar flow field/separator plates is that efficient mass transport of the reactants to the MEA is difficult. This is due, in large part, to the numerous drawbacks associated with the serpentine-channeled flow field/separator plates. For instance, because of pressure differentials across the serpentine arrangement as well as the geometry of the serpentine channel itself, reactants are not able to evenly disburse onto the gas diffusion layers and ultimately the catalytic active layers of the MEA. Additionally, these conventional flow field/separator plates have design constraints that limit their ability to handle water and transport it out of the cell on either the anode or cathode side of a fuel cell without compromising performance. These impede the flow of the cathode gas and anode gas to the MEA, which limits the power output of each cell and, ultimately, the entire fuel cell stack assembly. Additionally, using serpentine-channeled flow field/separator plates requires incremental pressure to overcome the impedance of the liquid water being handled within the cell, which results in an additional parasitic loss.

Usually, the individual fuel cells are secured within the stack by means of end plates clamped together by multiple torqued fasteners. These end plates, used in conjunction with a compression means, provide the pressure to the stack to ensure good electrical conductivity between the stack components, more specifically, inter alia uniform pressure between the MEAs and the flow field/separator plates and/or any other interim components. The end plates also provide pressure to the individual cell and stack sealing systems to prevent fuel and oxidant gas leakage or mixing within the cells in the stack or out of the stack. The pressure applied to the cells in the stack by the end plates generally is a function of the axial forces exerted on the plates by those fasteners. These forces are subject to great variability, which is problematic. For example, one of the particular troubles encountered as a result of variation in the pressures exerted on the stack is that the MEA may be damaged. Of all of the components in a stack, generally the MEA is the weakest and most prone to damage. Also, variable stress concentrations may damage the flow field/separator plates within the stack. Moreover, these pressure variations are compounded by the thermal expansion and contraction of the stack components as well as expansion and contraction of the MEA itself, due to inter alia humidity, impedance-induced heat, and reaction-induced heat.

Another problem associated with conventional fuel cell stack assemblies is that construction is predominantly manual. In constructing a fuel cell stack assembly, components of each individual cell are placed sequentially on top of each other; these remain loose until stack-clamping-fasteners are assembled to the stack and torqued. The stack-clamping-fasteners secure the components of the fuel cell stack together. Within the stack and when assembling the stack, the fragile (and expensive) MEA must be handled carefully to prevent incorrect positioning of the MEA between the flow field/separator plates. Due to the fragile nature of the MEA and the extreme care that must be exercised in stacking all fuel cell components, conventional manual assembly has been the most effective means to assemble fuel cell stacks. Moreover, if the MEA is not positioned correctly, the flow field/separator plates may be damaged.

An additional consequence is that damage or misplacement of a single MEA within a stack oftentimes causes the entire stack containing the cell to malfunction, thus requiring that the stack be entirely rebuilt. Misplacement or movement of the MEA within a fuel cell also can lead to gas leaks, premature failures, or a reduction in the power output of the MEA, resulting in cost penalties and other quality control pitfalls. Accordingly, for successful assembly and operation of a fuel cell and a fuel cell stack assembly, the MEA needs to able to be accurately and repeatably positioned so that there is a low risk of error. Heretofore known means and/or methods of controlling the position of the MEA have not been adequate.

If a single cell misfuctions for any of these reasons in a stack assembly, the stack assembly becomes ineffective and usually must be rebuilt. These assembly and reassembly issues pose significant challenges to efficient, higher-speed, or automated-assembly methodologies.

Accordingly, there is a need for an improved fuel cell stack design that minimizes these sorts of problems.

SUMMARY OF THE INVENTION

Herein provided is an improved fuel cell stack assembly.

One embodiment of a the fuel cell stacks of the present invention comprises: (a) a first end plate and a second end plate, the second end plate being aligned with the first end plate; (b) a plurality of fuel cells interposed between the first and second end plates, at least one of the fuel cells comprising: (i) a unitized MEA assembly, the unitized MEA assembly comprising an MEA and a frame, the MEA being sealed within the frame, (ii) an anode flow field, and (iii) a cathode flow field, (c) a plurality of internal foils, each internal foil having an first connection surface and a second connection surface; and (d) a compression means, the compression means securing the end plates, the plurality of fuel cells, and the plurality of internal foils to form a fuel cell stack assembly.

Another embodiment of a the fuel cell stacks of the present invention comprises: a first end plate and a second end plate, the second end plate being aligned with the first end plate; a plurality of fuel cells, the filet cells being interposed between the first end plate and the second end plate, and at least one of the fuel cells comprising: (i) at least one compound flow field, (ii) a second flow field, (iii) an MEA, and (iv) a frame; (c) a plurality of internal foils, each internal foil having an first connection surface and a second connection surface; and (d) a compression means, the compression means securing the end plates, the plurality of fuel cells, and the plurality of the internal foils together.

Another embodiment of a the fuel cell stacks of the present invention comprises:

(a) a first end plate and a second end plate, the second end plate being aligned with the first end plate; (b) a plurality of fuel cells, the fuel cells being interposed between the first end plate and the second end plate, and at least one of the fuel cells comprising: (i) at least one compound flow field, (ii) a second flow field, and (iii) a unitized MEA assembly, the unitized MEA assembly comprising an MEA and a frame, the MEA being sealed within the frame; (c) a plurality of internal foils, each internal foil having an first connection surface and a second connection surface; and (d) a compression means, the compression means securing the end plates, the plurality of fuel cells, and the plurality of internal foils together.

Other aspects and advantages of the present invention will be apparent to those ordinarily skilled in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like numbers indicate like features, and wherein.

DETAILED DESCRIPTION OF THE INVENTION

Disclosed herein is a novel fuel cell stack assembly. Among other things, the stacks of the present invention include improved flow fields that provide for inter alia more efficient water handling and reactant dispersion. In addition, requisite stack clamping pressures are greatly reduced, which enables a construction comprised of lighter weight, lower strength, lower cost materials. Another improvement minimizes the risk of displacement of the MEA within the stack assembly, and thus, minimizes the difficulties associated with assembly and resultant defects. Also, this construction protects the MEA from damage by excess or unequal stack clamping forces. Other advantages and features of the present invention will be apparent to those ordinarily skilled in the art in view of the following.

Figure 1:
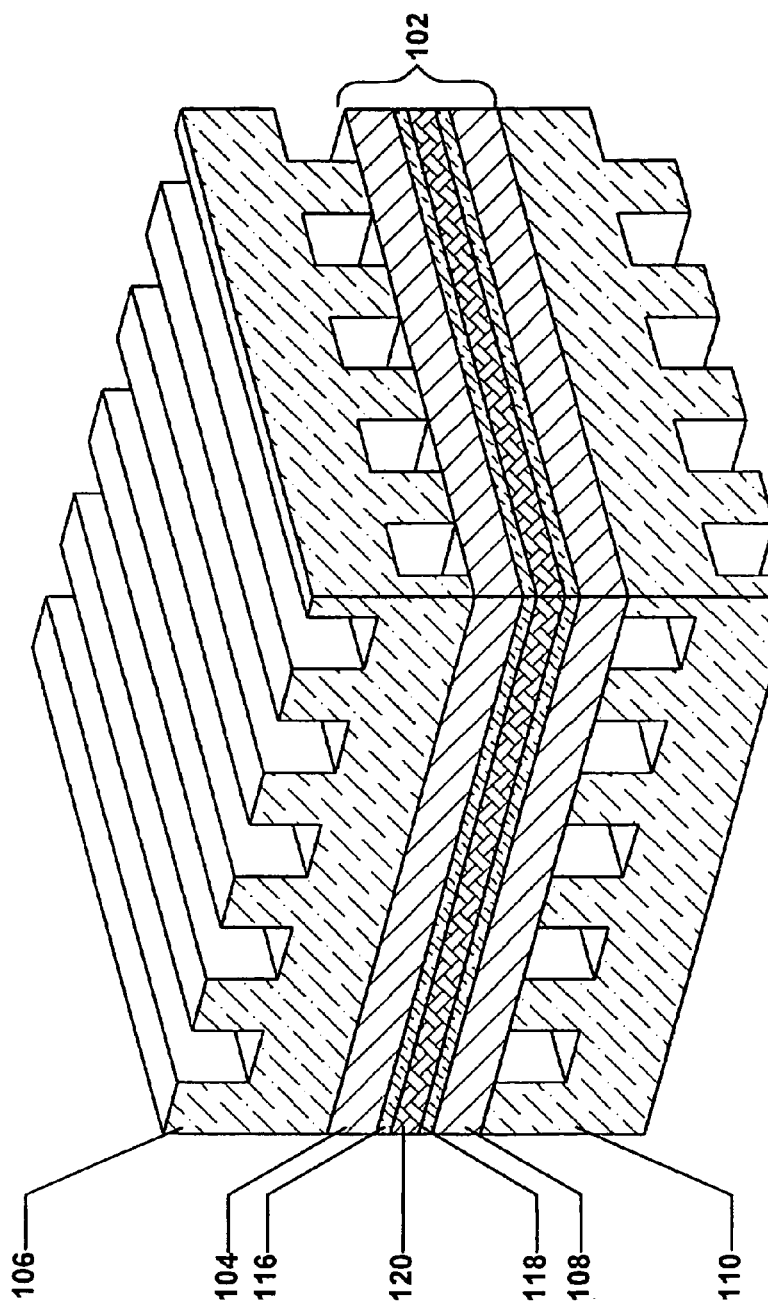
FIG. 1 is a representation of a typical PEM fuel cell assembly.
Figure 2:
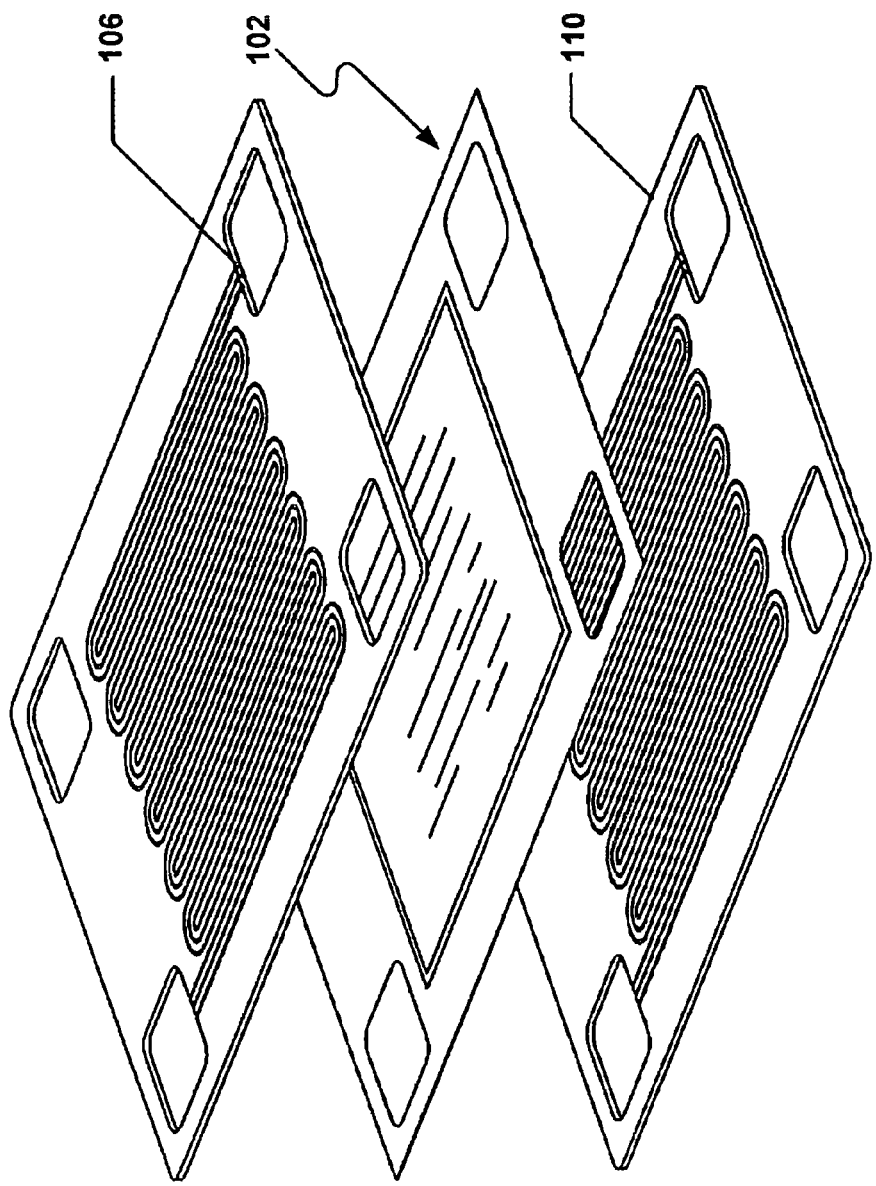
FIG. 2 is another view of a typical PEM fuel cell assembly extracted from a conventional stack assembly illustrating the serpentine-channeled flow field/separator plates.
Figure 3:
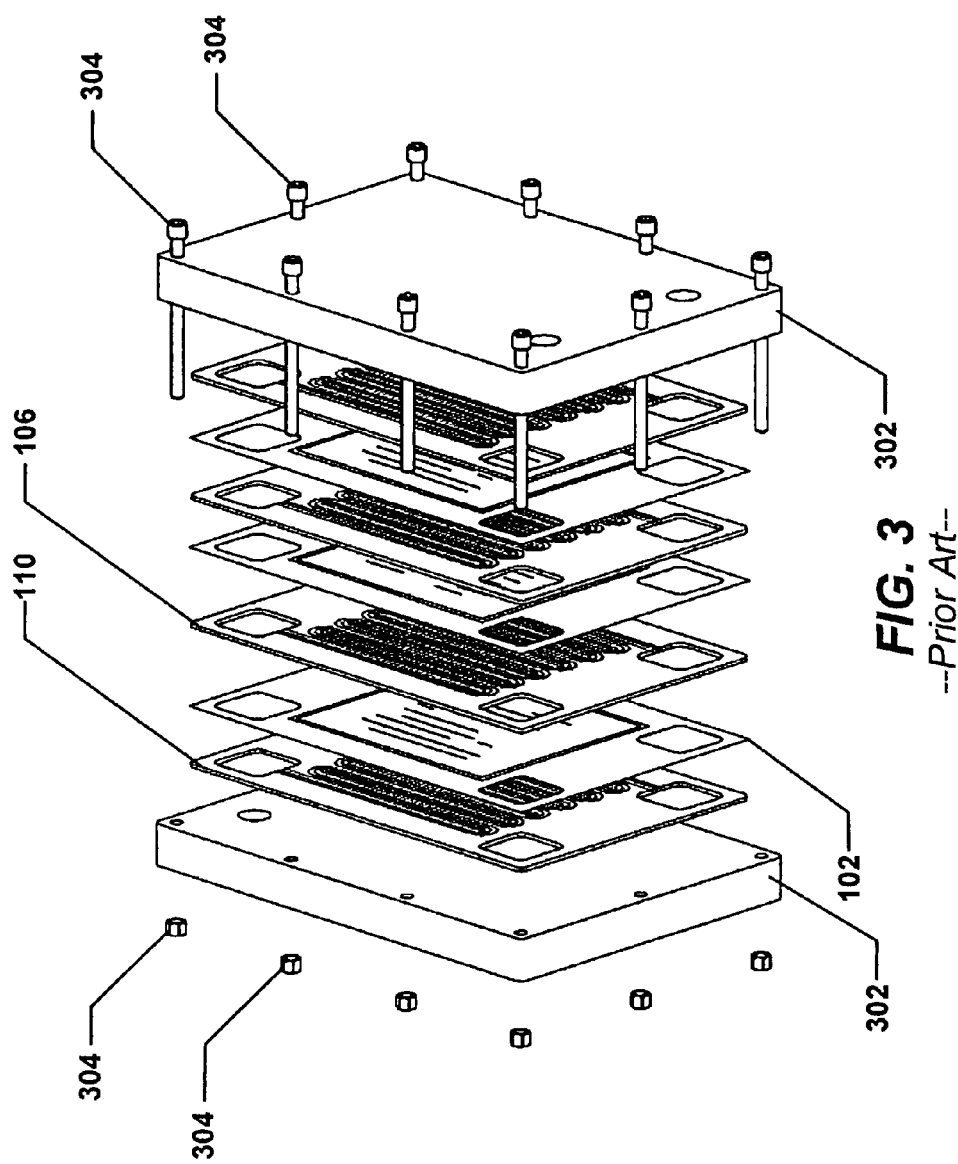
FIG. 3 is an example of a conventional fuel cell stack assembly, illustrating bipolar plate construction.
Figure 4:
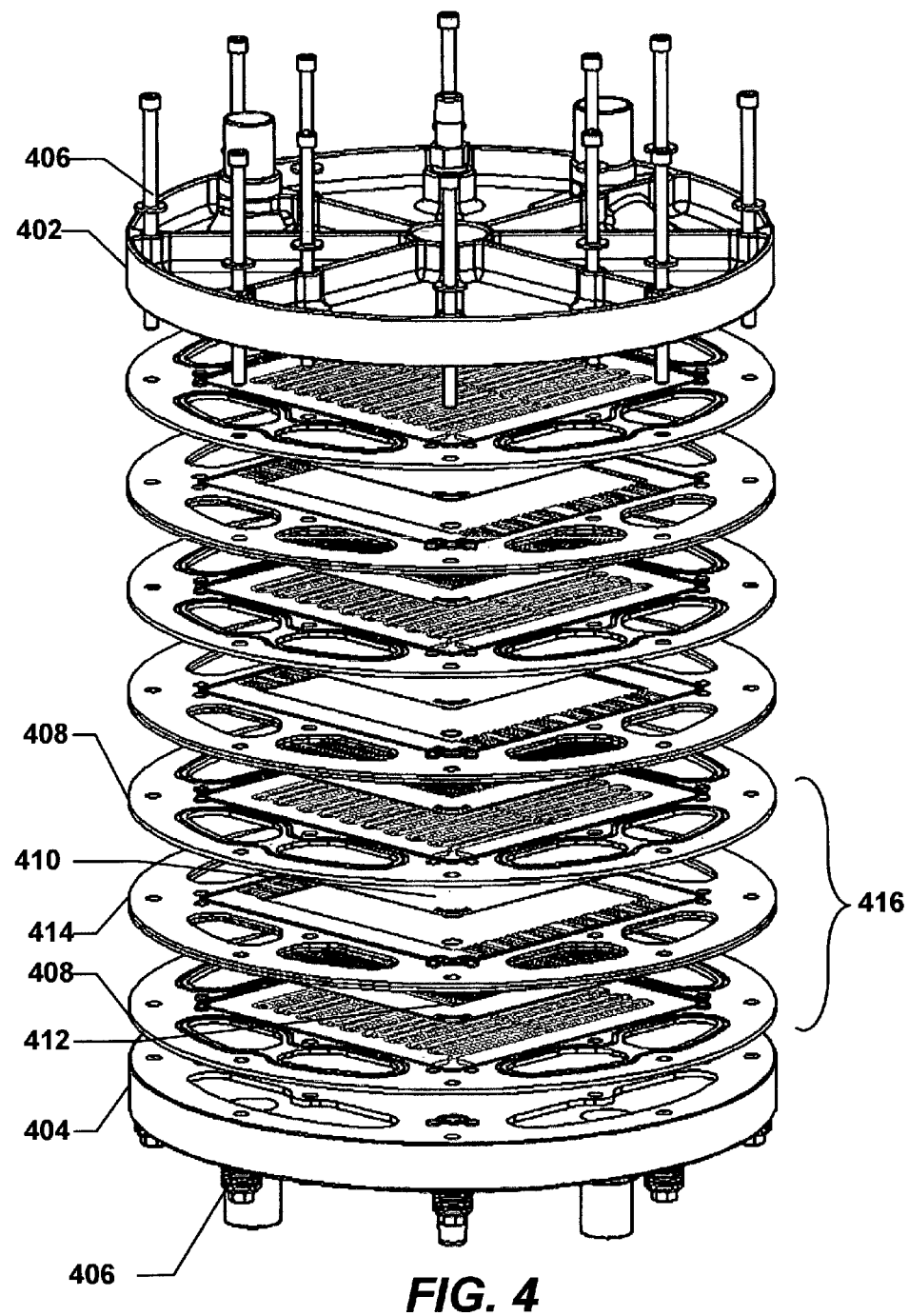
FIG. 4 is an illustration of one embodiment of the fuel cell stacks of the present invention.

Depicted in FIG. 4 is one embodiment of the fuel cell stacks of the present invention. Generally, in this embodiment, the stack comprises: a first end plate 402, a second end plate 404, a plurality of fuel cells interposed between the first and second end plates, a compression means, and optionally, heat exchangers interposed between neighboring fuel cells.

First end plate 402 and second end plate 404 aid in securing the components of the fuel cell stack together and distribute pressure in conjunction with the compression means to ensure good electrical conductivity and stack sealing. Preferably, end plates 402 and 404 may be made from a plastic material. Thus, a broader range of lower-cost as well as lighter weight materials may be advantageously used. Depending on the desired end-use of the stack, however, metal end plates or the like also may be suitable. Although end plates 402 and 404 are depicted as circular members in FIG. 4, each end plate may have any shape, for example, substantially circular, substantially rectangular, or substantially square, depending primarily on the configuration of the MEA and the manifold and clamping methodologies utilized in the stack. One of ordinary skill in the art with the benefit of this disclosure will be able to determine the appropriate shape and configuration of the end plates.

In the embodiment shown in FIG. 4, one means to compress the components of the stack together to ensure adequate electrical connection is shown. It comprises threaded fasteners 408 and corresponding bolts 406. This is one example of a suitable compression means for the fuel cell stacks of the present invention. Preferably, the end plates and the compression means are designed to work together to ensure adequate clamping force to provide appropriate sealing and adequate pressure for good electrical conductivity between the stack components. Moreover, in the stacks of the present invention, cell pressures are determined and limited by individual distribution frames and thus are unaffected by any stack compression forces that are above the designed clamping force range. The end plates and the compression means can be designed so as to exert nominal forces, which assures that total clamping force is attained without concern for clamping force variation. Required flow field-to-MEA clamping forces are in the range of only 30 to 60 psi as compared to conventional designs that require pressures that are magnitudes greater. This is one of the distinct advantages of the present invention. In part, these reduced compression pressures are possible with the stacks of the present invention because of the unique design of certain components of the fuel cells interposed between the end plates in the stack. These components are discussed more in detail below but include enhanced flow fields and enhanced MEA assemblies. Moreover, the favorable characteristics of the flow field and MEA interfaces also assist in enabling the stacks of the present invention to operate at lower pressures. Because of these enhanced components, operating pressures are also reduced and allow full power density to be attained at less than 1 psi for the reactant gases.

In the embodiment shown in FIG. 4, disposed between the first end plate 402 and the second end plate 404 are a plurality of fuel cells, at least one of the cells 416 comprising a unitized MEA 414, an anode flow field/internal foil assembly 410, and a cathode flow field/internal foil assembly 412. The anode flow field of the anode flow field/internal foil assembly 410 is juxtaposed to the anode side of the unitized MEA, and the cathode flow field of the cathode flow field/internal foil assembly 412 is juxtaposed to the cathode side of the unitized MEA. The use of unitized MEA assemblies in the present invention is advantageous. It is preferable but not required that each fuel cell interposed between the first end plate and the second end plate include a unitized MEA assembly.

In the most preferred embodiments of the fuel cell stacks of the present invention, a unitized MEA assembly is used in at least one of the fuel cells interposed between the first end plate and the second end plate, wherein the MEA is sealed to the frame so as to be integral with this separate and durable frame. This stabilizes the placement of the MEA within the fuel cell and the stack assembly. Among other things, the frames housing the MEA provide sealing interfaces, fluid manifolds and passages, intercomponent alignment and registration, and fastener orifices. The preferable design also allows the unitized frame to be preassembled and tested and then subsequently handled in semi-automated or fully automated assembly processes. This construction greatly improves assembly productivity and reduces stack level defects.

In one of the preferred embodiments as shown in FIG. 4, at least one cell but preferably each fuel cell interposed between the first end plate 402 and the second end plate 404 includes a sandwich unitized MEA assembly like the one shown at 414. Sandwich unitized MEA assembly 414 is one embodiment of a unitized MEA assembly suitable for use in the present invention. The anode flow field/internal foil assembly 410 is juxtaposed on the anode side of the sandwich unitized MEA assembly; the cathode flow field/internal foil assembly 412 is juxtaposed to the opposing cathode side of the sandwich unitized MEA assembly. In the embodiment shown in FIG. 4, juxtaposed to each anode flow field/internal foil assembly and cathode flow field/internal foil assembly are heat exchangers, such as heat exchanger 408. Heat exchanger 408, for example, may be a single or multicomponent heat exchanger, or an integral or separately manifolded heat exchanger.

Figure 5:
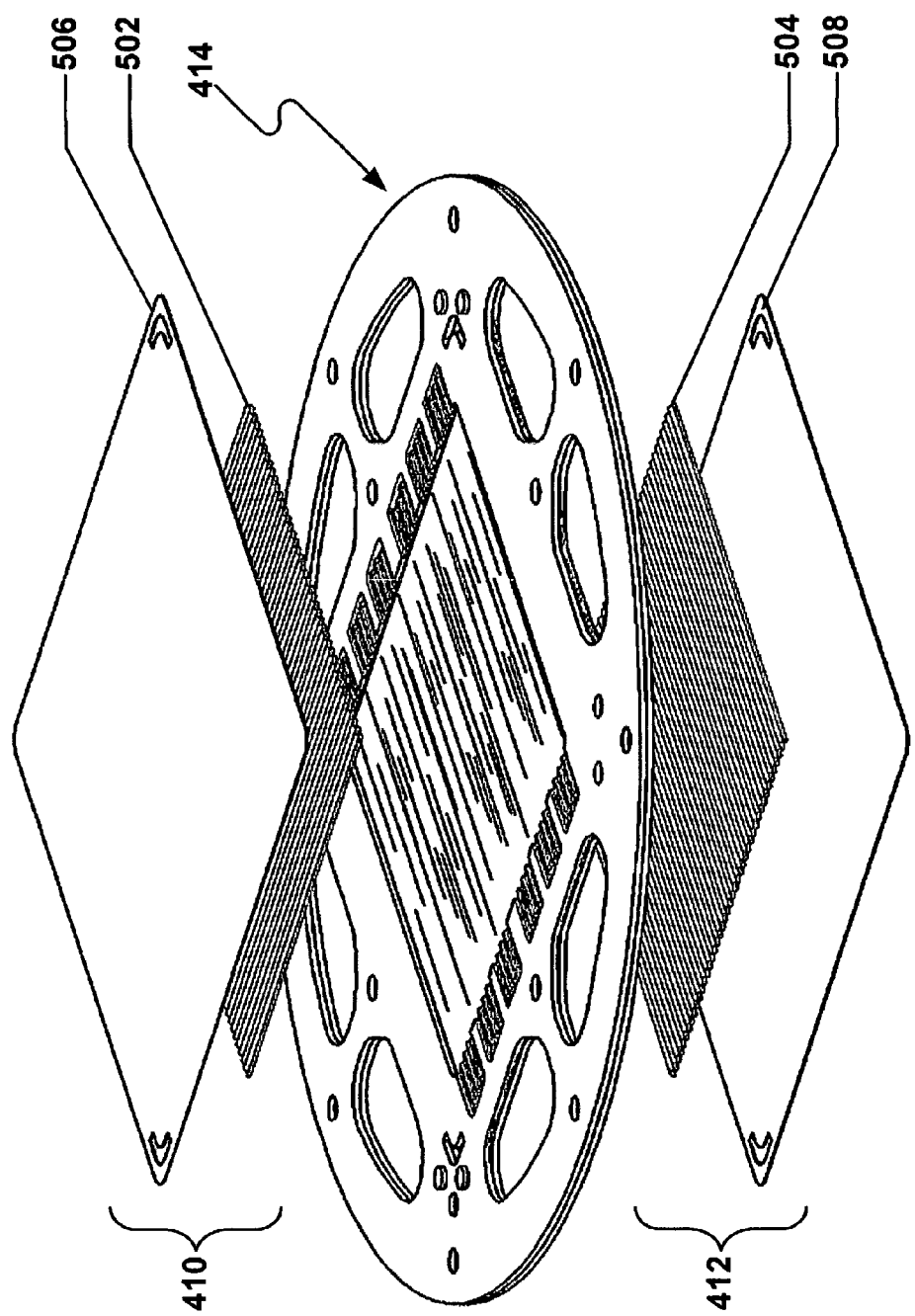
FIG. 5 is a representation of one embodiment of the fuel cells of the fuel cell stack illustrated in FIG. 4.

To more particularly illustrate the arrangement of the individual cell components (e.g., the unitized MEA, the anode flow field, the cathode flow field, and the internal foils terminating the cell), refer to FIG. 5. FIG. 5 illustrates an exploded view of the elements of a preferred embodiment of a single fuel cell extracted from one of the preferred embodiments of the stacks of the present invention illustrated in FIG. 4. Sandwich unitized MEA assembly 414 is the central component of the cell. Anode flow field/internal foil assembly 410 is juxtaposed to the anode side of unitized MEA assembly 414, and comprises a flow field 502 and an internal foil 506. Cathode flow field/internal foil assembly 412 is juxtaposed to the cathode side of unitized MEA assembly 414, and comprises a flow field 504 and an internal foil 508. The internal foils of the flow field/internal foil assemblies terminate the cell and separate it from neighboring cells in the stack.

Figure 6:
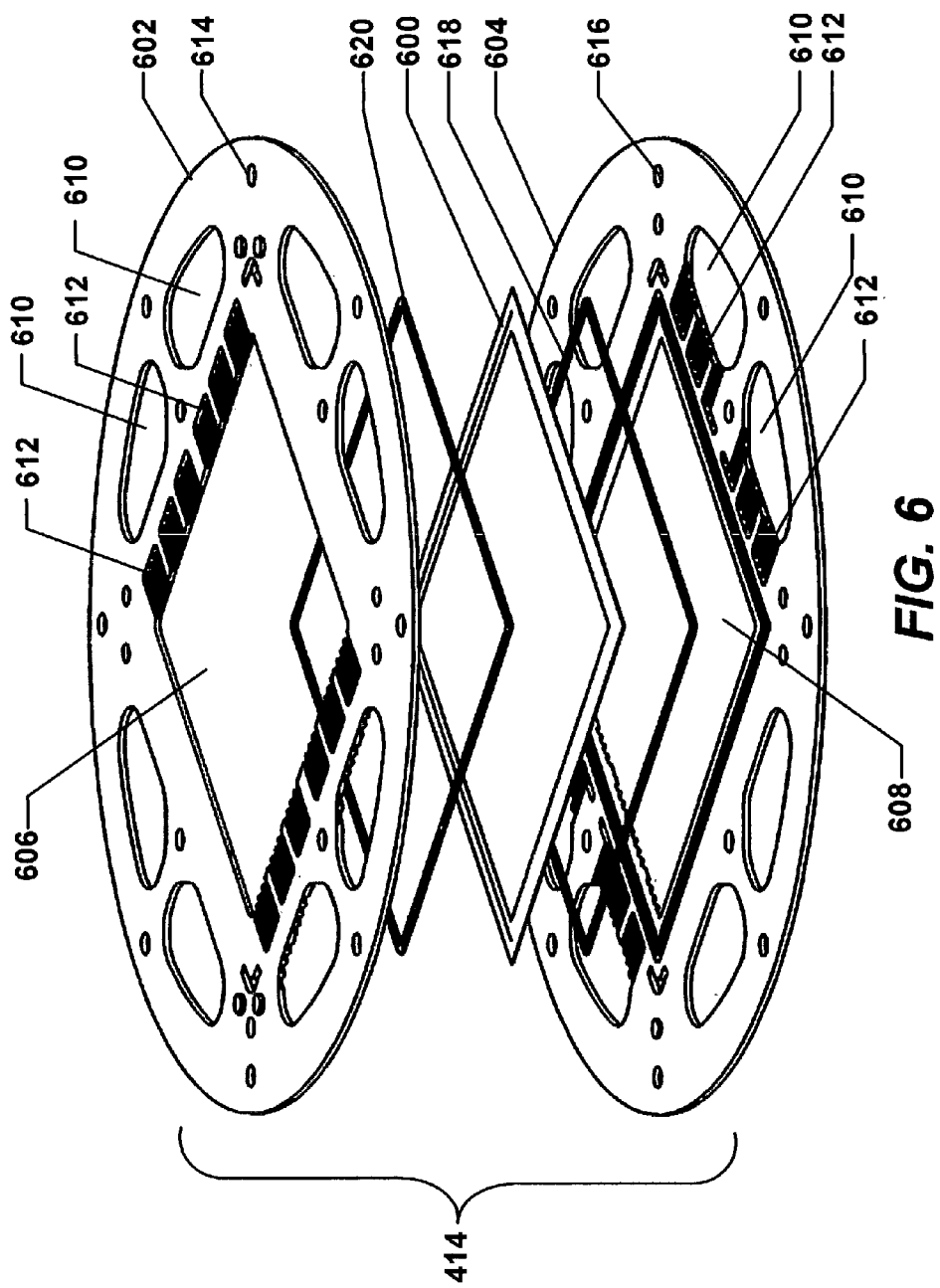
FIG. 6 is an exploded view of an embodiment of the sandwich unitized MEA assemblies suitable for use in the fuel cell stacks of the present invention.

To more particularly illustrate sandwich unitized MEA assembly 414, refer to FIG. 6. As illustrated by the exploded view of sandwich unitized MEA assembly 414 in FIG. 6, in this embodiment, two sections of a frame "sandwich" an MEA. MEA 600 is sealed to the frame so as to be integral to the frame. Although a circular frame is depicted in FIGS. 4, 5 and 6, any frame of whatever size, shape or otherwise capable of supporting an MEA and functioning in a fuel cell environment, may be advantageously used to achieve the objectives of the present invention.

In the sandwich embodiment of suitable unitized MEA assemblies as depicted in FIG. 6, the MEA is sealed between two lateral sections of the frame by clamping the MEA between the two sections. The anterior section of the frame is shown at 602; the posterior section is shown at 604. To ensure that MEA 600 is properly sealed between the two sections, it is preferred that at least one elastomeric spring element be located on at least one of the two sections. It is even more preferred that both sections comprise an elastomeric spring element. The use of an elastomeric spring element on at least one of the sections helps secure MEA 600 between the sections of the frame. The preferable elastomeric spring elements are depicted at 620 and 618. When the two sections containing the elastomeric spring elements are brought into contact with the MEA, the elastomeric spring elements hermetically clamp the MEA into internal cavity 606 of the anterior section and internal cavity 608 of the posterior section of the frame. Optionally, the MEA may be bonded to one or both of the sections of the frame as an alternative to the use of an elastomeric spring element. Such bonding also can be used in conjunction with the elastomeric spring elements. In another alternate embodiment of the sandwich embodiment of a unitized MEA assembly, a thermoplastic and compliant seal such as a polyolefin plastic can be first bonded to the PEM flange of the MEA, and then the MEA may be placed within the sections of the frame. Such a seal also may be used in conjunction with the elastomeric spring elements or not, depending on the desired design. When stacked together on either side of the MEA, the two sections of the frame are then attached to each other by methods including, but not limited to, ultrasonic welding, heat staking, or otherwise bonding to form a unitized integral MEA frame assembly.

In a preferred embodiment of the sandwich unitized MEA assembly, sections 602 and 604 of the frame are exactly the same and interchangeable, requiring only a single mold versus separate anterior and posterior molds. Thus, a single piece can serve as either the anterior section or the posterior section. This simplifies inventory management and manufacturing as well as increases assembly efficiency.

Any appropriate nonconductive material suitable for the fuel-cell environment may be used for the material of construction for the frame sections of the sandwich embodiment of suitable unitized MEA assemblies. A polysulfone-based material is especially suitable. There is no requirement that both sections be constructed from the same material nor is there a requirement that both sections have exactly the same configuration. Preferably, however, both sections do have the same configuration so that the sections are the same and interchangeable.

Preferably, each section of the frame should incorporate corresponding manifolds to facilitate the flow of reactants to the MEA for the electrochemical exchange. Examples of such manifolds are illustrated in FIG. 6 at 610. Also, preferably, the frame should include a configuration that facilitates the flow of reactants to the MEA. Reactant supply channels 612 such as those shown in FIG. 6 are a suitable example.

Optionally, the frame may also include holes to be used in conjunction with the compression means providing alignment and containment for clamping fasteners. Such holes are illustrated in FIG. 6 at 614 and 616.

Figure 7:
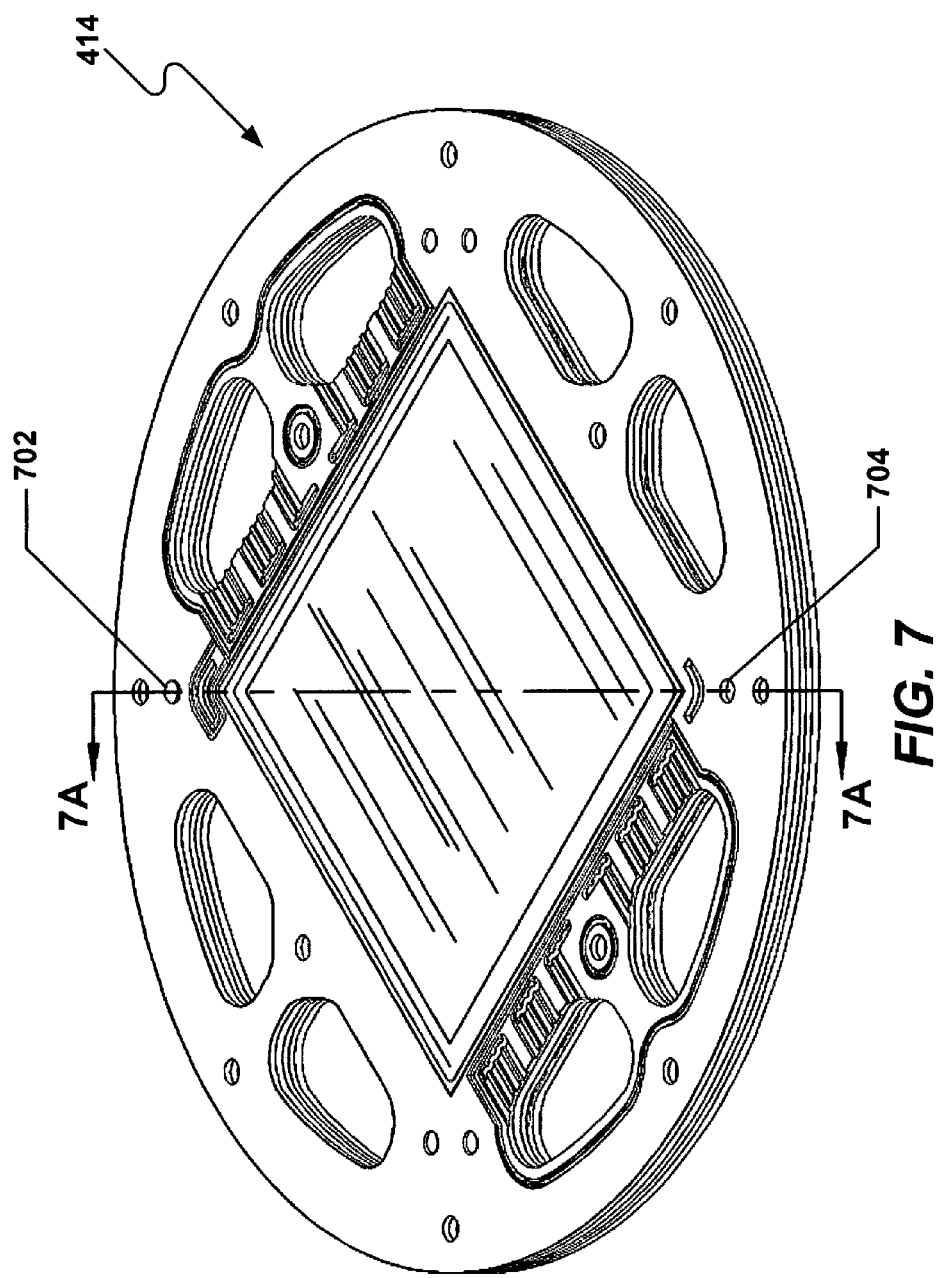
FIGS. 7 and 7A illustrate the raised alignment features and corresponding alignment cavities that are suitable for use in the present invention.
Figure 7A:
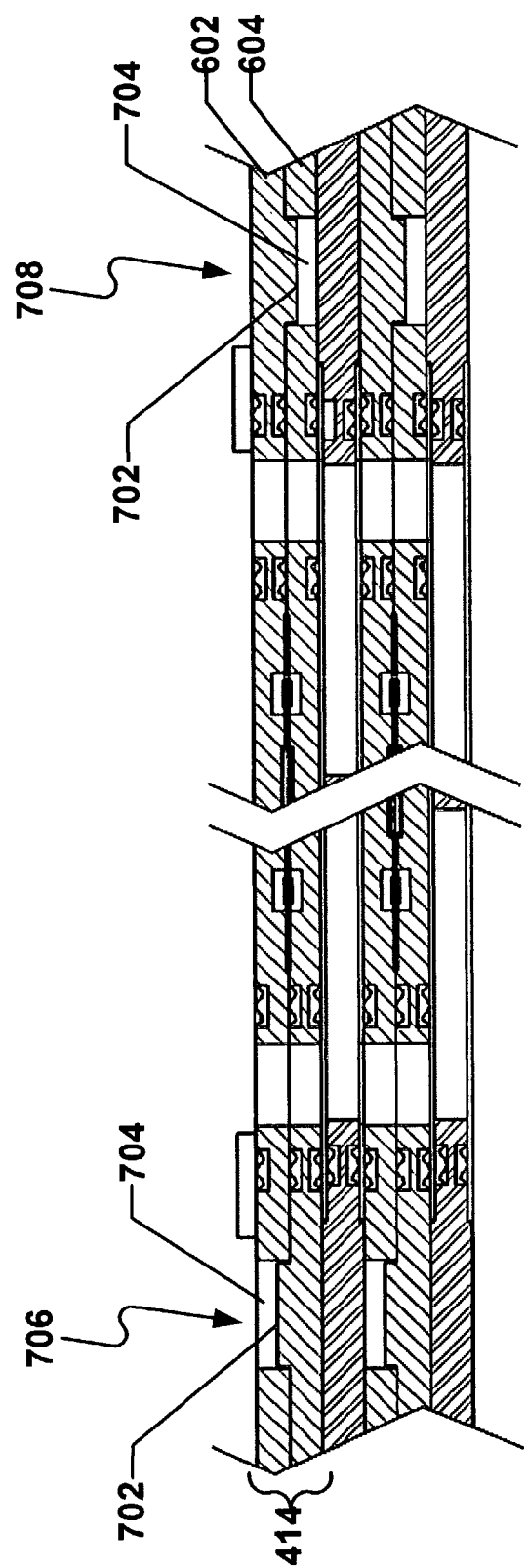

Other optional features that may be incorporated into the frame that houses the MEA or other stack components are shown in FIG. 7 and FIG. 7A. Raised alignment features and corresponding alignment cavities can be incorporated into each section of the frame so that when the sections of the frame are brought together to form a sandwich unitized MEA assembly, the raised alignment features and cavities mate and align the sections. Such a raised alignment feature is shown at 702 and the corresponding alignment cavity is shown at 704 in FIG. 7. The raised alignment features may align sections of a unitizing frame as shown in FIG. 7, with the raised alignment feature showing at 702 engaging in the cavity shown at 704 (also shown in FIG. 7A in the cross section at location 706 and location 708.) These features, which engage asymmetrically on two identical parts with opposite functions, assure both that the two parts can only be assembled in the proper orientation and that they are correctly registered to each other to provide their clamping and unitizing function. No incremental external alignment means is required, which both simplifies and allows quicker assembly.

Figure 8:
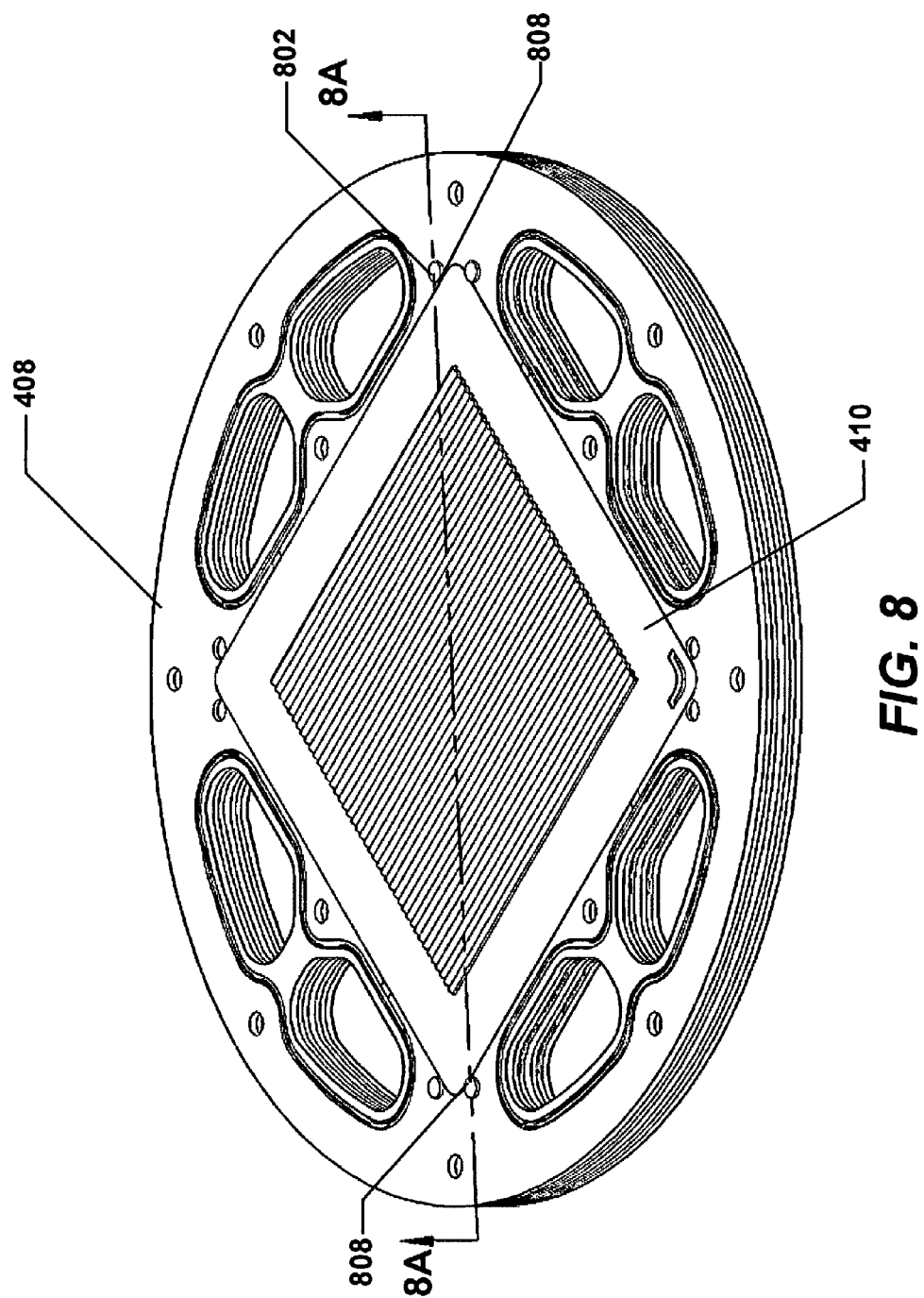
FIGS. 8 and 8A illustrate the raised alignment features and corresponding alignment cavities that are suitable for use in the present invention.
Figure 8A:
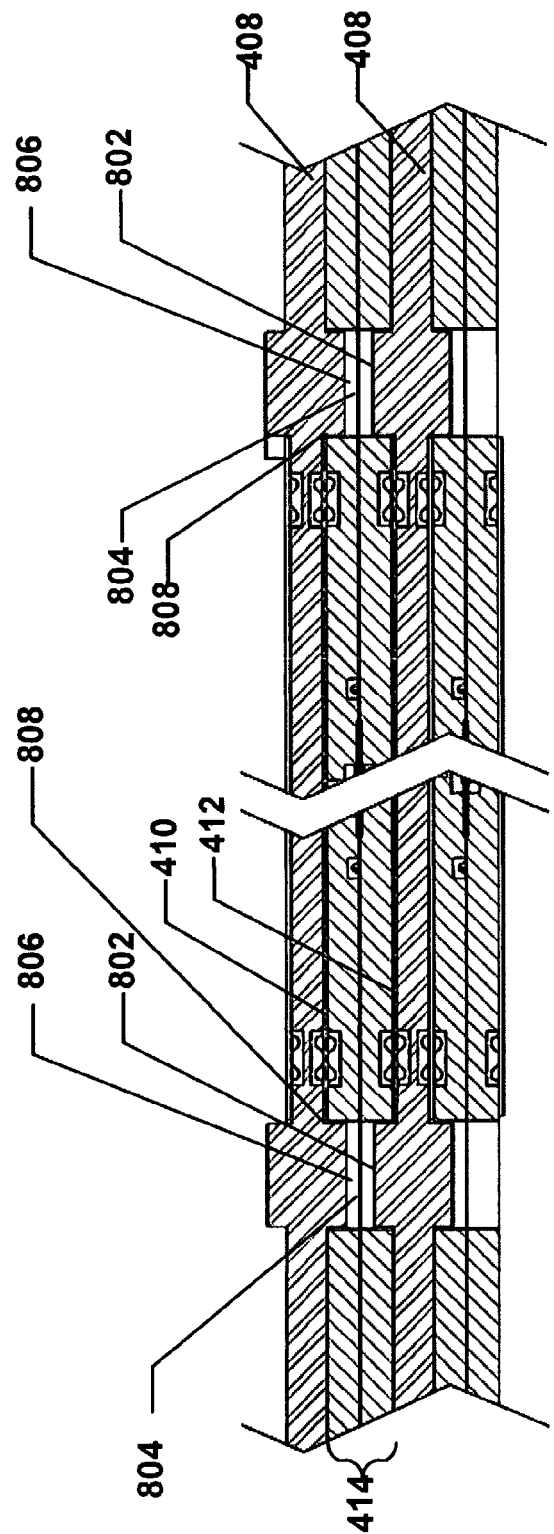

In the case of subsequent and/or sequential parts within a stack, such as the heat exchanger 408 or the internal foil separator plates of the anode flow field/internal foil assembly 410 or the cathode flow field/internal foil assembly 412, such alignment features as those described above can be used to beneficially align both previous and subsequent fuel cell components, transferring specific orientation and component registration throughout an entire stack. Shown in FIG. 8 is heat exchanger 408 and the internal foil of anode flow field/internal foil assembly 410. Raised alignment features and corresponding alignment cavities can be used to orient and register not only the flow field/internal foil assembly and heat exchangers, but also the unitized MEAs to the heat exchangers. For instance, referring to FIG. 8A (which is a cross-section of FIG. 8), raised alignment feature 802, of a first heat exchanger 408, locates within cavity 804 on a subsequent part, for example unitized MEA assembly 414 as shown on FIG. 8A. Another part could provide the mating cavity to raised alignment feature 802, depending on the configuration of the cell components. Cavity 804 in turn mates with the raised alignment feature 806 of the second heat exchanger 408. This method also doubles in this particular embodiment as the alignment method of the internal foil separator plate of the anode flow field/internal foil assembly 410. Alignment is accomplished on its outside diameter within component 802, seen at locations 808 (also shown on FIG. 8) allowing it to be of a smaller area than would be required if it had to be expanded in area to permit external alignment fixtures or engagement with other potential alignment features such as the stack fasteners. Thus, the area, and therefore the cost, of the internal foil separator plate can be minimized. This is very advantageous because the internal foil separator plate is one of the more expensive components of the stack.

These examples are not meant to be limiting. Alignment features can be altered to suit the application and manufacturing method. These features however are most preferably applied to net shape molded parts, for example, the preferred design of the unitizing frame of the unitized MEA assemblies as described herein and its equivalents.

Figure 9:
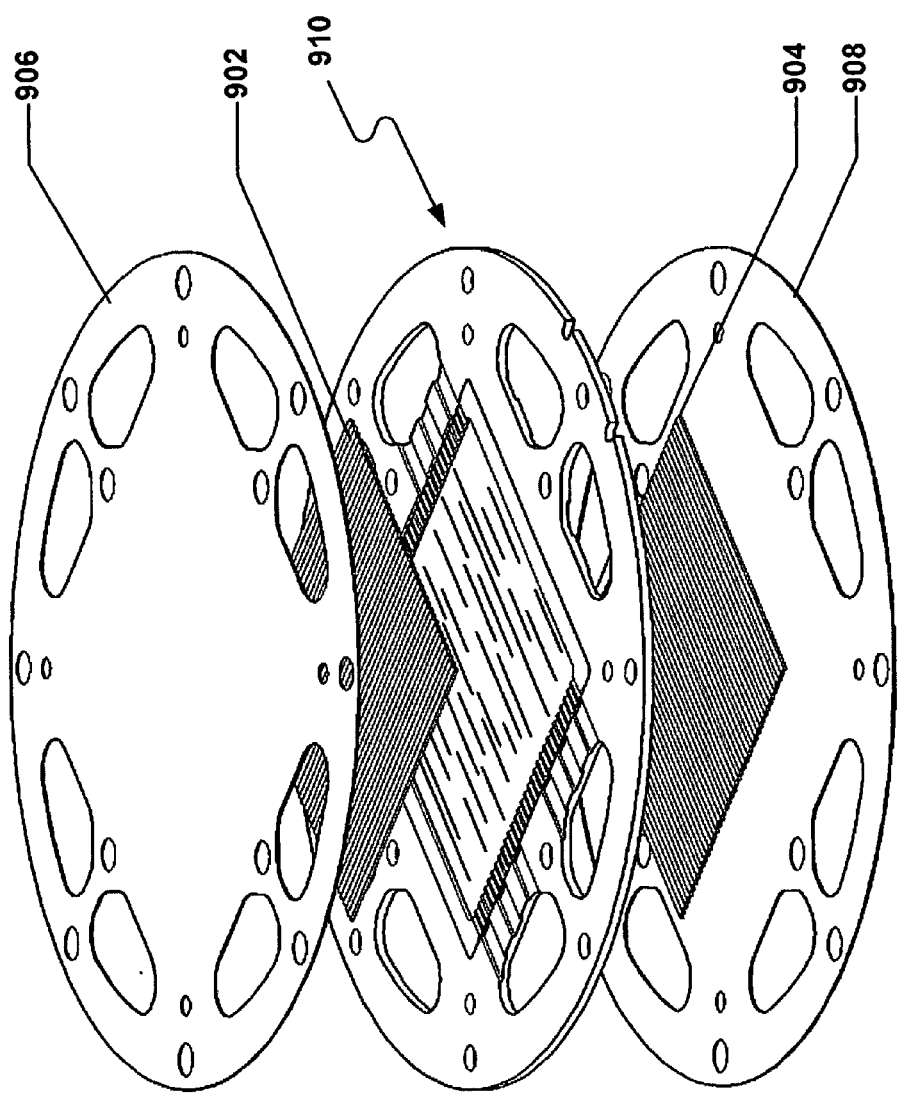
FIG. 9 is an exploded version of an embodiment of a fuel cell suitable for use in the stacks of the present invention, the fuel cell comprising a cantilevered unitized MEA assembly.
Figure 10:
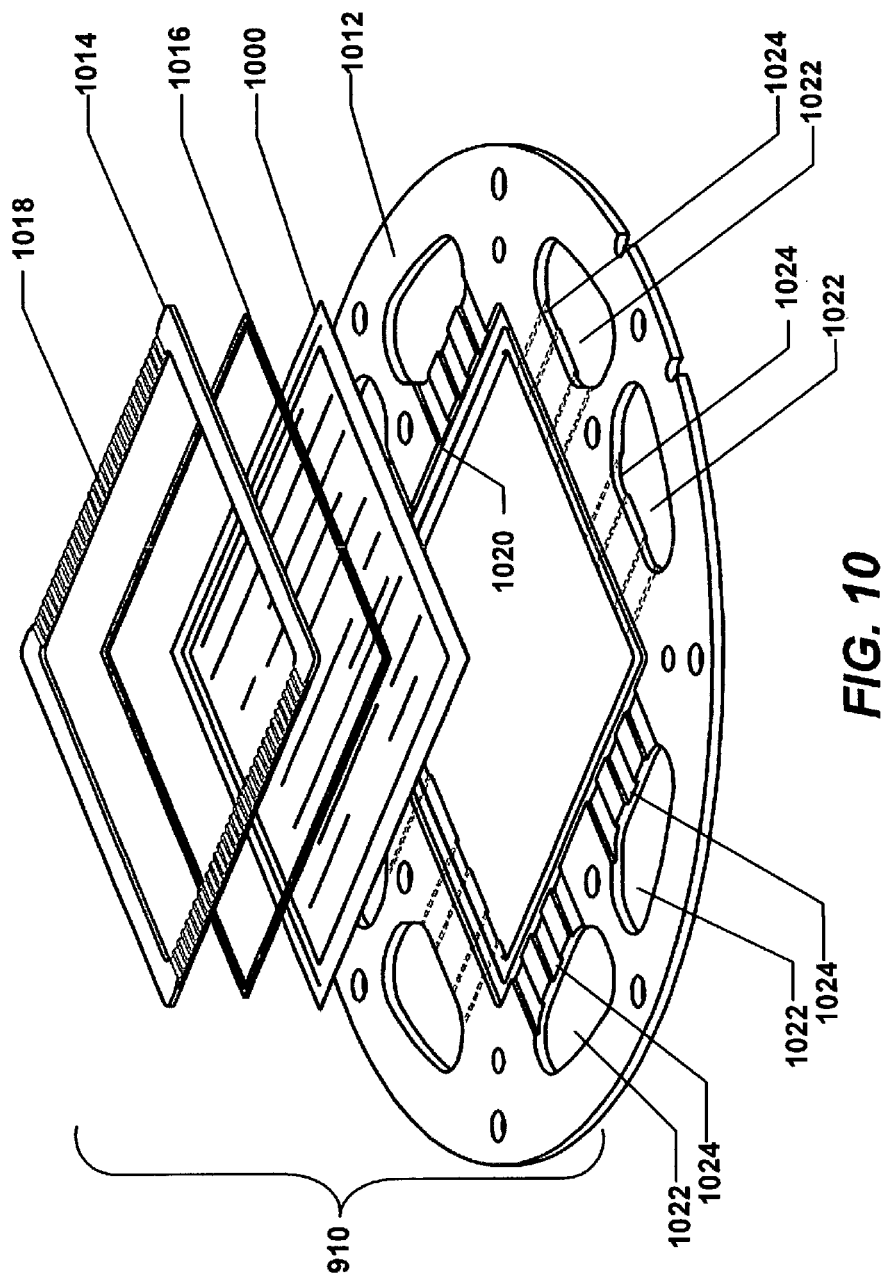
FIG. 10 is an exploded view of an embodiment of a cantilevered unitized MEA assembly suitable for use in the present invention.

Although the sandwich unitized MEA assembly is the preferred unitized MEA assembly for use in the fuel cell stacks of the present invention, another embodiment of a suitable unitized MEA assembly is a cantilevered unitized MEA assembly. This design is illustrated in FIGS. 9 and 10. FIG. 9 illustrates the elements of a fuel cell from a stack assembly that comprises a cantilevered unitized MEA assembly; FIG. 10 is an exploded view of the cantilevered unitized MEA assembly. Fuel cells incorporating a cantilevered unitized MEA assembly may be used instead of cells comprising a sandwich unitized MEA assembly (i.e., a cantilevered unitized MEA assembly may be used in the fuel cells of the stack shown in FIG. 4 as opposed to the sandwich unitized MEA assembly) in the stacks of the present invention. Alternatively, cantilevered unitized MEA assemblies may be used in conjunction with sandwich unitized MEA assemblies in stacks in any desirable pattern, for example, one cantilevered embodiment following one sandwich embodiment, or one cantilevered embodiment following every two sandwich embodiments, and so on. One of ordinary skill in the art with the benefit of this disclosure will be able to determine the desired interchange of cantilevered and sandwich embodiments within a stack to suit a desired end-use.

Illustrated in FIG. 9 is internal foil 906, anode flow field 902, cantilevered unitized MEA assembly 910, cathode flow field 904, and internal foil 908. Essentially, the assembly of the cell is the same as that described above—the flow fields are juxtaposed to the MEA and the internal foils are juxtaposed to the opposite surfaces of the flow fields and serve to separate the flow fields from neighboring fuel cell components such as heat exchangers or flow fields of any adjacent cell.

FIG. 10 more particularly illustrates the components of the cantilevered unitized MEA assembly 910 embodiment. MEA 1000 is housed within and made integral with frame 1012. The frame 1012 shown in FIG. 10 is only one example of the types of frames that are suitable in this embodiment of a suitable unitized MEA assembly. For the frame depicted in FIG. 10, manifolds 1022 provide the fuel and the air to the MEA housed within the internal cavity of frame 1012 necessary for the electrochemical reaction. The manifolds 1022 optionally may be enhanced by adding fuel and air supply channels 1024 to the frame.

In the embodiment shown in FIG. 10, the MEA is bonded to the lip of the interior cavity 1020 of the frame 1012. This bond can be accomplished by heat staking the MEA to the frame using a thermoplastic adhesive or the like. Other methods will be available to those skilled in the art with the benefit of this disclosure, for example, other kinds of adhesive and/or bonding techniques may be appropriate (e.g., epoxies, silicon adhesives, etc.). Thermal bonding is the preferred method, however. Preferably, the bonds between the MEA and the frame should be such that no leaks occur and the seal is hermetic.

In addition to adhering the MEA itself to the frame, in this embodiment, if desired, a sealing clamp may be used to further secure the MEA to the frame. In FIG. 10, the sealing clamp is illustrated at 1014. If used, sealing clamp 1014 should preferably be shaped in the same geometry as the interior cavity of the frame. For example, in FIG. 10 sealing clamp 1014 is square-shaped to conform to the shape of the square shape of frame 1012. The sealing clamp also contains an internal cavity so that the MEA is accessible to the reactants for the requisite electrochemical exchange. The width of the sides of sealing clamp 1014 preferably should be of an appropriate width for securing the MEA to the frame. Even more preferably the width of sealing clamp 1014 should be sufficient to carry secondary elastomeric spring element 1016. Preferably, secondary elastomeric spring element 1016 is attached to the sealing clamp 1014 through mechanical bonding, adhesives, or any other appropriate method prior to the sealing clamp being placed in the frame. Another appropriate method of attaching the secondary elastomeric spring element to the sealing clamp is by injection molding it in place onto the sealing clamp. Once the sealing clamp and secondary elastomeric spring element are combined, that combination may then be inserted into the internal cavity of the frame on top of the MEA (which has been bonded to the frame as described above). The sealing clamp may but need not be affixed to the frame.

The sealing clamp is preferably made from a plastic that is appropriate for the fuel cell environment. For example, the following non-limiting examples are suitable: fiberglass reinforced plastic, and phenolics. Nonconductive materials are more appropriate than conductive materials. Also, the material should be relatively incompressible.

The secondary elastomeric spring element 1016 is preferably a silicon-based elastomer. Other materials also may be appropriate. The material must have an appropriate spring-rate for the available free and compressed heights to deliver desirable clamping force.

The height of the internal cavity of the frame dictates the height of the sealing clamp secondary elastomeric spring element combination. Once inserted into the internal cavity, the combination preferably should be such that the sealing clamp is appropriately loaded once the frame is assembled to mating parts of the fuel cell or stack assembly.

An optional additional feature of the sealing clamp that may be useful for effective use of this sealing clamp is a means to facilitate gas transmission to the MEA. For example, grooves such as those shown at 1018 on FIG. 10 on the top surface of sealing clamp 1014 may be used. If used, such grooves are more advantageously used if oriented in-line with the reactant supply means of the frame (e.g., fuel and air supply channels 1024). Also, if used, the total cross-sectional area of the grooves should be such that the flow of the reactants from the reactant supply means of the frame is not impeded. To obtain the desirable reactant flow, the number, size, and placement of the grooves should be considered. Generally speaking, as an illustration, if the reactant supply means are wide channels, then the grooves are more-effective if they are designed such that the size of the voids between the grooves on the sealing clamp is minimized (i.e. tightly spaced). The groove should also not negatively impact the sealing function by having too wide of a span between them.

Alignment features (such as described above) are also useful in this embodiment for facilitating orientation and registration of the fuel cell components within a stack assembly. If incorporated into the frame of the cantilevered unitized MEA design, the raised alignment features and corresponding alignment cavities preferably are located symmetrically or diagonally across from each other, preferably adjacent to the internal cavity. These features may help facilitate the placement and effective use of the subsequent components of the fuel cell assembly. If such alignment features are used, they can perform the additional function of facilitating the registration of the internal foils separating neighboring cells as described above, thus minimizing the size of the internal foil. Refer to FIGS. 7 and 7A and 8 and 8A and the related discussion regarding such alignment features.

The cantilevered unitized MEA fuel cell embodiment shown in FIG. 9 illustrates a cell wherein the internal foils reflect the shape of the frame housing the MEA. This embodiment as well as the one described above wherein alignment features are incorporated within the structure of the frame so as to facilitate minimization of the size of the internal foils are equally applicable.

Other embodiments of a unitized MEA assembly wherein the MEA is integral to a supporting frame are also suitable for use in the fuel cell stacks of the present invention. Those of ordinary skill with the benefit of this disclosure will be aware of other suitable embodiments.

Referring again to the stack again of FIG. 4, flow field/internal foil assemblies 410 and 412 are not the only appropriate flow fields/separator plate assemblies that may be used in the cells in the stacks of the present invention. For example, conventional serpentine-channeled flow field/ separator plates may be used. If conventional serpentine-channeled flow field/separator plates are used as the flow fields of the individual cells in the stack, then internal foils separating those plates are not necessary as such plates inherently separate neighboring fuel cell components. Other integral flow field assemblies (i.e. flow field assemblies that comprise an anode for one cell, a cathode for an adjacent cell in the stack, and a barrier separating the two) are also appropriate. A gas barrier of some type between neighboring anodes and cathodes is necessary to prevent reactant mixing and to provide adequate sealing. When separate flow fields are used for the anode of one cell and the cathode of a neighboring cell, internal foils oftentimes are the most effective type of barrier between the adjacent flow fields, but others may be suitable. In FIG. 4, individual flow fields made from three-dimensional reticulated material are used in both the anode and the cathode. Thus, internal foils separating neighboring anode flow fields and cathode flow fields are necessary. This is illustrated at anode flow field/internal foil assembly 410 and cathode flow field/internal foil assembly 412.

Figure 11:
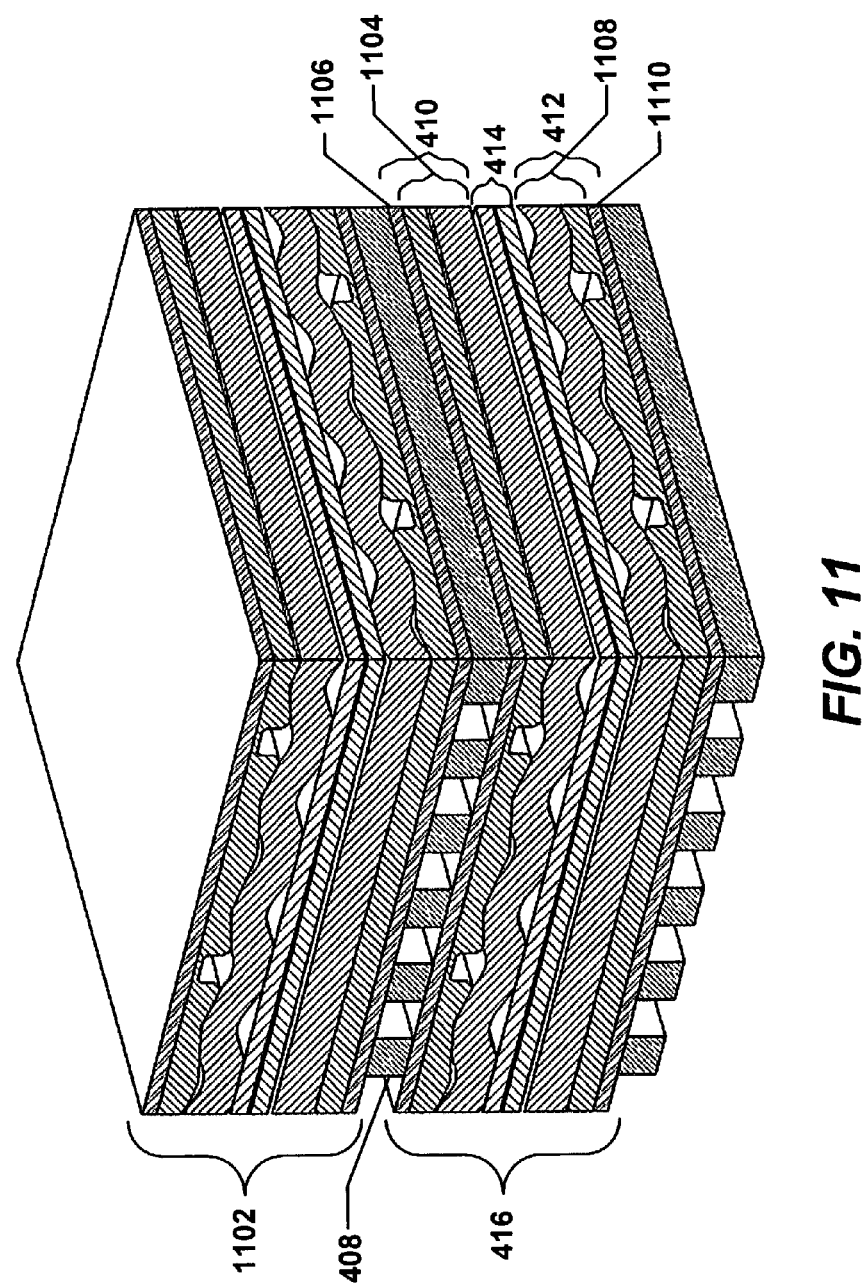
FIG. 11 is a sectioned-view of one embodiment of the present invention wherein neighboring fuel cells in a stack are separated by a heat exchanger.

FIG. 11 is a sectioned view of two fuel cells from the stack of FIG. 4. FIG. 11 is provided to more particularly illustrate the flow fields and internal foils of the adjacent cells. In FIG. 11, cell 416 comprises: anode flow field/internal foil assembly 410, unitized MEA assembly 414, and cathode flow field/internal foil assembly 412. The internal foils are adjacent to the flow fields to provide a barrier between neighboring cell components, e.g., the neighboring components of cell 416 and cell 1102 or heat exchanger 408. Anode flow field/internal foil assembly 410 comprises an anode flow field 1104 and an internal foil 1106 juxtaposed to that flow field. Cathode flow field/internal foil assembly 412 is comprised of a cathode flow field 1108 and an internal foil 1110. The flow fields may but need not be bonded to the foils.

Figure 12:
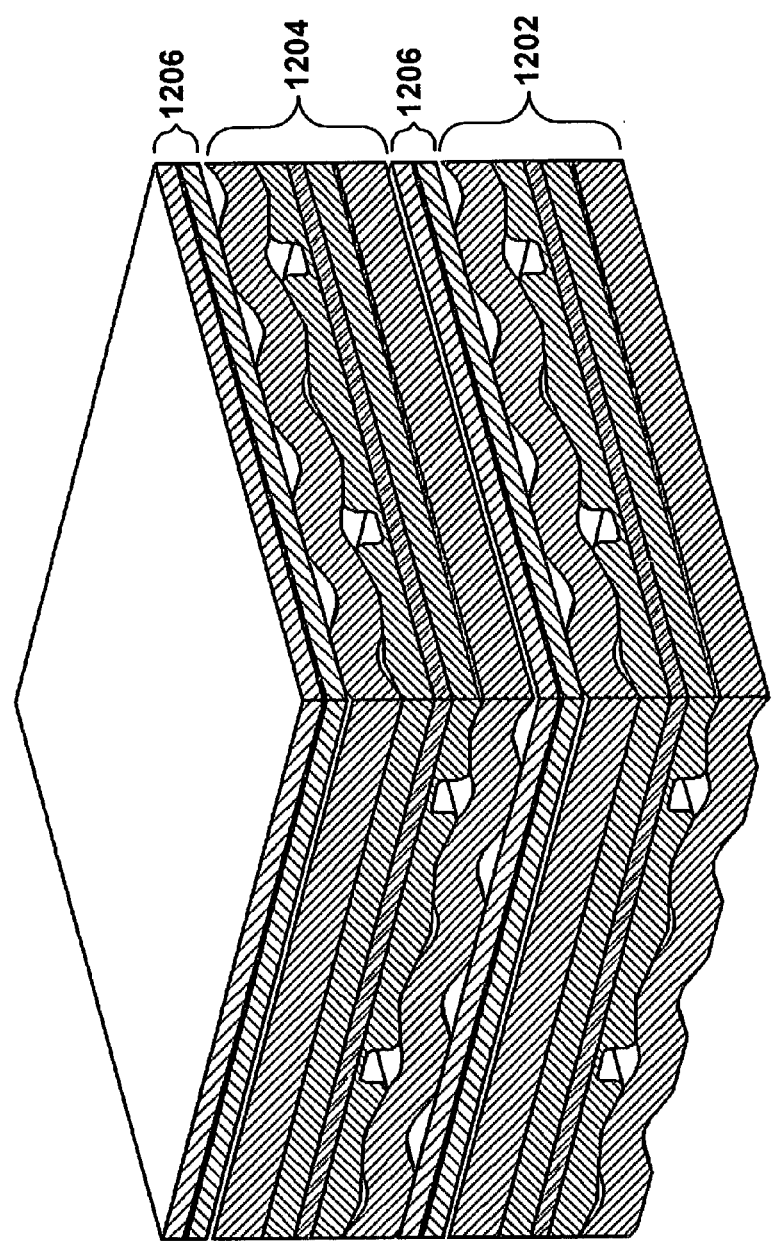
FIG. 12 is a sectioned-view of one embodiment of the present invention wherein neighboring fuel cells in a stack are arranged in a true bipolar arrangment.

In true bipolar embodiments, the internal foil separates neighboring anodes and cathodes directly, i.e., there is not structure in between the anode and the internal foil or the cathode and the internal foil that interrupts the continuity between the elements. In other embodiments, juxtaposed to the internal foil is a heat exchanger, which is oftentimes a heat exchange plate. The heat exchanger serves to collect and remove impedance-induced heat and reaction-induced heat. Heat exchanger 408 can have any configuration suitable for removing heat from the stack. The heat exchanger may but need not include air-cooling or water-cooling means. FIG. 11 illustrates one embodiment of this embodiment. FIG. 12, on the other hand, depicts a true bipolar embodiment. Shown in FIG. 11 is a sectioned view of two true bipolar plate assemblies, 1202 and 1204, alternating with MEAs 1206 with no interspersed heat exchange means.

In a preferred design, heat exchanger 408 used should reflect the design of the frames that house the MEA such that the manifolds that facilitate the flow of reactants within the stack are uninterrupted. Also, in a preferred design, each cell is separated from the neighboring cell by a heat exchanger; in other designs, every other cell in the stack is separated from a neighboring cell by a heat exchanger. Alternate patterns for heat exchanger use such as one for every two or one for every three or one for every four cells and so on are also suitable.

Any type of flow fields may be suitable for the present invention, for example, at anode flow field 1104 and cathode flow field 1108 in FIG. 11, including conventional bipolar flow field/separator plates—if such conventional bipolar flow field/separator plates are used, however, internal foils are not necessary to separate neighboring cells. Preferably, however, the flow fields used in the present invention are constructed primarily from a conductive three-dimensional reticulated structure. One advantage obtained from utilizing a three-dimensional reticulated structure in the present invention is that mass transfer within the resultant flow fields is enhanced. This is because inter alia both liquid and vapor phase water is transported through the foam with reduced impedance as compared to the typical flow field/separator assembly and also because of the interrupted surface topography due to the generated waffle surface. Another advantage of using a reticulated structure in the flow fields suitable in the present invention is that this material provides compliancy for thermal and mechanical variances within the cell and stack assemblies. The term "compliancy" as used herein means that it provides flexibility to absorb compound tolerance differentials of the multiple components in a fuel cell as well as within a fuel cell stack assembly. Moreover, there are at least two kinds of compliancy: plastic compliancy (generally permanent and irreversible), and elastic compliancy (capable of compressing in response to a force and then returning with little or no hysteresis). In the present invention, the use of the reticulated structure in the flow fields of the present invention allows the flow fields to exhibit not only plastic compliancy, but also elastic compliancy. It is this elastic compliancy that allows the flow fields of the present invention to follow the thermal and humidity expansions and contractions of the membrane and of the fuel cell members that occur during operation of the fuel cell stack. As one example of a suitable three-dimensional material the reticulated material used is a nickel foam that is 1.9 mm thick with a porosity of 90 ppi and a weight of 500 g/m².

Even more preferably, this three-dimensional reticulated structure has at least one corrugation, i.e., a deformation from a plane. A more preferred flow field comprises a plurality of corrugations. An even more preferred flow field suitable for the present invention is a compound flow field, which comprises two elements: a primary flow field and a mating flow field.

Figure 13:
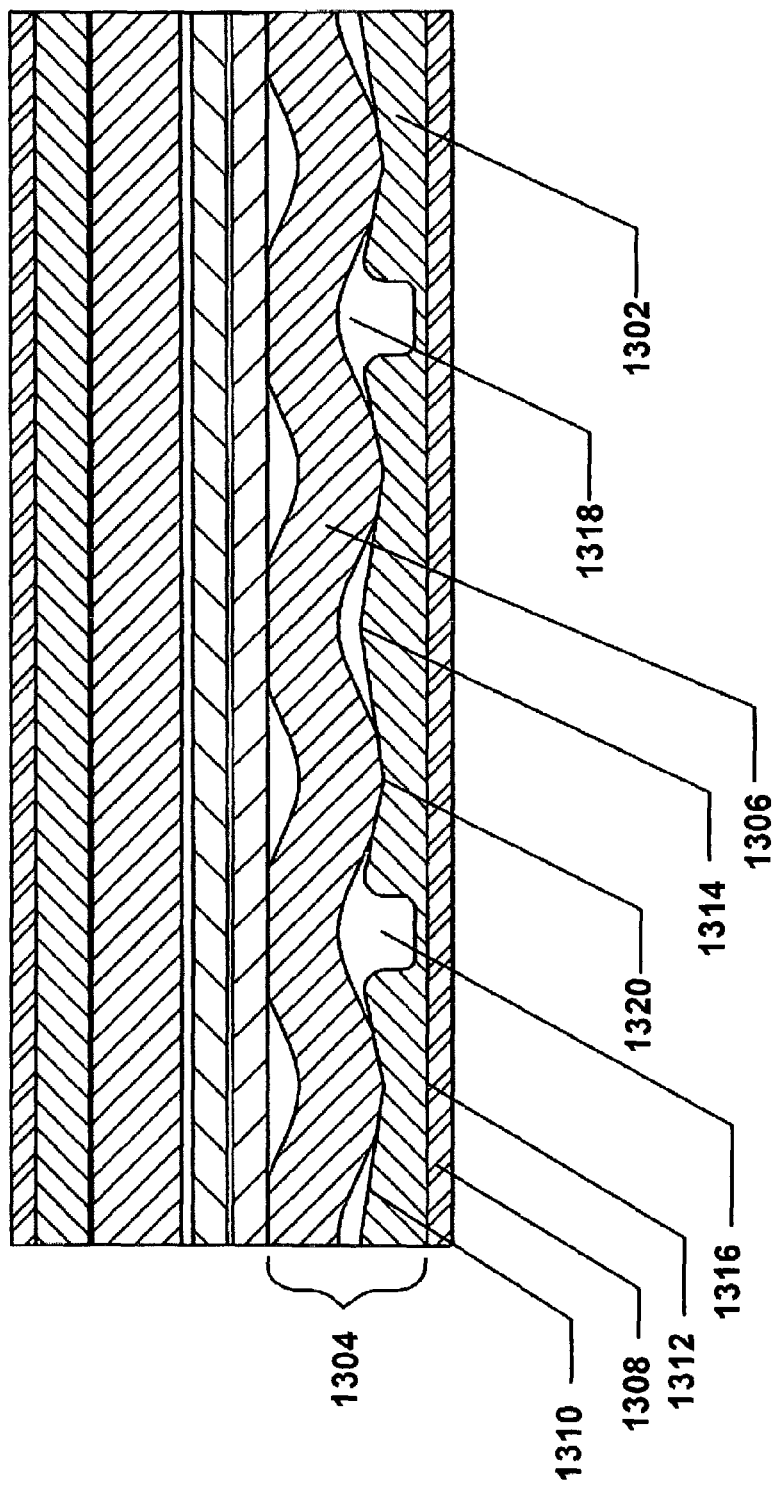
FIG. 13 is a schematic illustrating one embodiment of compound flow fields that are suitable for use in the present invention.

If using a compound flow field in the anode and/or the cathode of a cell in a stack of the present invention, preferably, both the primary flow field and the mating flow field of the compound flow field are compression-formed so as to have unique compression-formed geometries advantageous to the operation of the fuel cell. These two components work together to facilitate, inter alia, gas flow distribution, very low-pressure operation, uniform loading of the flow field, enhanced surface area contact with the gas dispersion layers of the MEA, water management, heat management, and current collection. These compound flow fields also act to provide compliancy to the fuel cell assembly to accommodate both thermal and mechanical variances within the fuel cell and the fuel cell stack assembly. FIGS. 11, 12 and 13 illustrate the preferred compound flow fields. FIG. 13 provides a cross-sectional view of the flow fields.

Specifically, in FIG. 13, one embodiment of suitable compound flow fields is shown at 1304. Compound flow field 1304 comprises primary flow field 1306 and mating flow field 1302.

Preferably, primary flow field 1306 is made from a conductive, compression-formed, three-dimensional, reticulated structure. Primary flow field 1306 is compression formed in a forming process that imparts the desired geometry and densities to the reticulated structure. In a preferred embodiment, the primary flow field has at least one corrugation, i.e., a deformation from a plane. In a most-preferred embodiment, the structure of the primary flow field has a plurality of corrugations as shown in FIG. 13. In even a more-preferred embodiment, in the structure of the primary flow field, a subset of the corrugations are located in a first plane, a second subset of the corrugations are located in a second plane, the first plane and the second plane are substantially parallel, and neighboring corrugations belong to different subsets. One example of this type of preferred structure would be where the structure of the primary flow field appears to have a substantially sinusoidal-like wave pattern appearance. One example of a suitable pitch-to-run ratio of the frequency of the wave pattern in the primary flow field is 1 to 2. Other suitable deformation patterns and frequency ratios will be recognized by those skilled in the art with the benefits of this disclosure.

Because the primary flow field is most advantageously produced using a compression process, as a result of the compression process the densities of the reticulated structure may vary transverse to any corrugations in the structure. The resultant structure has a three-dimensional geometry of varying height and thickness, which imparts advantageous qualities to the compound flow field that ultimately improve the performance of the stack.

In a preferred embodiment, the reticulated foam used to form the primary flow field is a nickel foam that is 1.9 mm thick with a porosity of 90 ppi and a weight of 500 g/m$^2$. Other metal foams or similarly reticulated materials, of course, may be suitable.

The mating flow field is used in conjunction with the primary flow field and is shown generally at 1302 in FIG. 13. It provides a low-electrical resistance interface between the primary flow field 1306 and the internal foil 1308. Another function, especially apparent on the cathode side, is to enhance the produced water-handling capability of the primary flow field.

Preferably, similar to the primary flow field, the mating flow field is formed from a conductive compression-formed, three-dimensional, reticulated structure. The three-dimensional, reticulated structure is preferably nickel foam. Other conductive reticulated structures are suitable as well if the material of construction is amenable to the fuel cell environment and application. The mating flow field may but need not be constructed from the same material as the primary flow field. The most preferred embodiment, however, utilizes the same or a similar reticulated material in both the primary flow field and the mating flow field.

In a preferred embodiment, the mating flow field has two sides, 1310 and 1312, which serve different functions. Side 1312 contacts the internal foil 1308 that separates the adjacent fuel cell components. Side 1312, preferably, is designed such that it has a flat compliant surface, which is especially conducive to providing low electrical resistance between the compound flow field and the internal foil utilizing only flow field-to-MEA reactive forces for loading. Even though side 1312 is preferably a flat surface, the mating flow field has a certain compliancy because of the structure of its reticulated material. This provides an excellent interface with the flat surface of the internal foil that allows for low electrical resistance.

However, side 1310, which is adjacent to the primary flow field, is formed to work in conjunction with the primary flow field. Although other features may be incorporated into side 1310, there are features that impart the desired functionality to the mating flow field. The combination of features desired in the mating flow field that will yield the most effective operation of the compound flow field will depend inter alia on the structure of the primary flow field and its desired functionality. The three most advantageous features that optionally and beneficially may be employed include positioning peaks, recessed areas, and cradles. Shown at 1314 is a positioning peak that helps orient the primary flow field to the mating flow field so that the two can work together. These positioning features substantially facilitate aligning the primary flow field in its proper position relative to the mating flow field. The feature depicted at 1316 is a recessed area compressed into the mating flow field. Recessed area 1316 combines with a valley created by a deformation in the primary flow field (e.g., at 1318) to create a microchannel, which enhances gas distribution and water management within the compound flow field. In effect, recessed area 1316 enhances the cross-sectional area of the microchannel created by the deformation in the structure of the primary flow field. Recessed area 1316 preferably is used in a compound flow field that is used in the cathode of the fuel cell as opposed to the anode. Recessed areas 1316 also can be created in the mating flow field so as to be transverse to the opposing voids created at, for example, 1318 by primary flow field 1306. This may enhance water management and/or gas utilization within the cell as well as the stack, depending on flow field orientation to supply and exhaust ports. The feature depicted at 1320 is a cradle that provides a low-resistance interface between the primary flow field and the mating flow field. Cradle 1320 also imparts structural integrity to the compound flow fields. The run of the cradles of the mating flow field preferably is designed to accommodate the structure of the primary flow field.

The compound flow fields of the present invention may be used advantageously in either the anode or the cathode side of a fuel cell assembly. In one embodiment, when the fuel cell is assembled, the compound flow fields are arranged in the cell relative to the MEAs and internal foils in the cell as depicted in FIG. 11. Anode flow field 1104 comprises a compound flow field, which comprises a primary flow field and a mating flow field. Similarly, cathode flow field 1108 comprises a compound flow field, which comprises a primary flow field and a mating flow field.

A compound flow field is preferably used in the anode as well as the cathode for each cell; however, it is contemplated within the present invention that only the anode or only the cathode may comprise a compound flow field. When compound flow fields are used in both the anode and cathode, the anode compound flow field (shown at 1104) is located on one side of the first MEA 414; the cathode compound flow field (shown at 1108) is located on the opposite side of the first MEA 414 (FIG. 11).

Moreover, preferably, the anode compound flow field and the cathode compound flow field are positioned so as to be transverse to one another. This preferred transverse positioning of the anode compound flow field and the cathode compound flow field is illustrated in FIGS. 11 and 12. Preferably, this transverse positioning is done in each cell of a stack. The presence of heat exchanger 402 (as shown in FIG. 11) should not affect the preferable transverse placement of the anode and cathode flow fields.

Most preferably, in the preferred embodiments of the fuel cell stacks of the present invention, a unitized MEA assembly is used in conjunction with the compound flow fields to attain the most advantageous operation. The unitized distribution frame provides a discrete defined height limiter, which, in conjunction with the above flow fields, allows for a uniform force per area to be applied. What is more, due to the elastic compliance of the compound flow fields, discrete variations in both the static and dynamic thickness of the MEA can be accommodated without causing undue localized stresses.

Appropriate flow field to MEA interface pressure is created with the transverse intersection of anode and cathode flow fields, which, due to their sinusoidal wave configuration, produces a three-dimensional grid at their intersection which further includes an expanded contact area due to the relative deformation of the flow field form at the intersection points. The resulting pressure distribution and gradient allows full current density and a low resistance interface at an average of about 2 to 4 kg/cm$^2$ loading.

Figure 14:
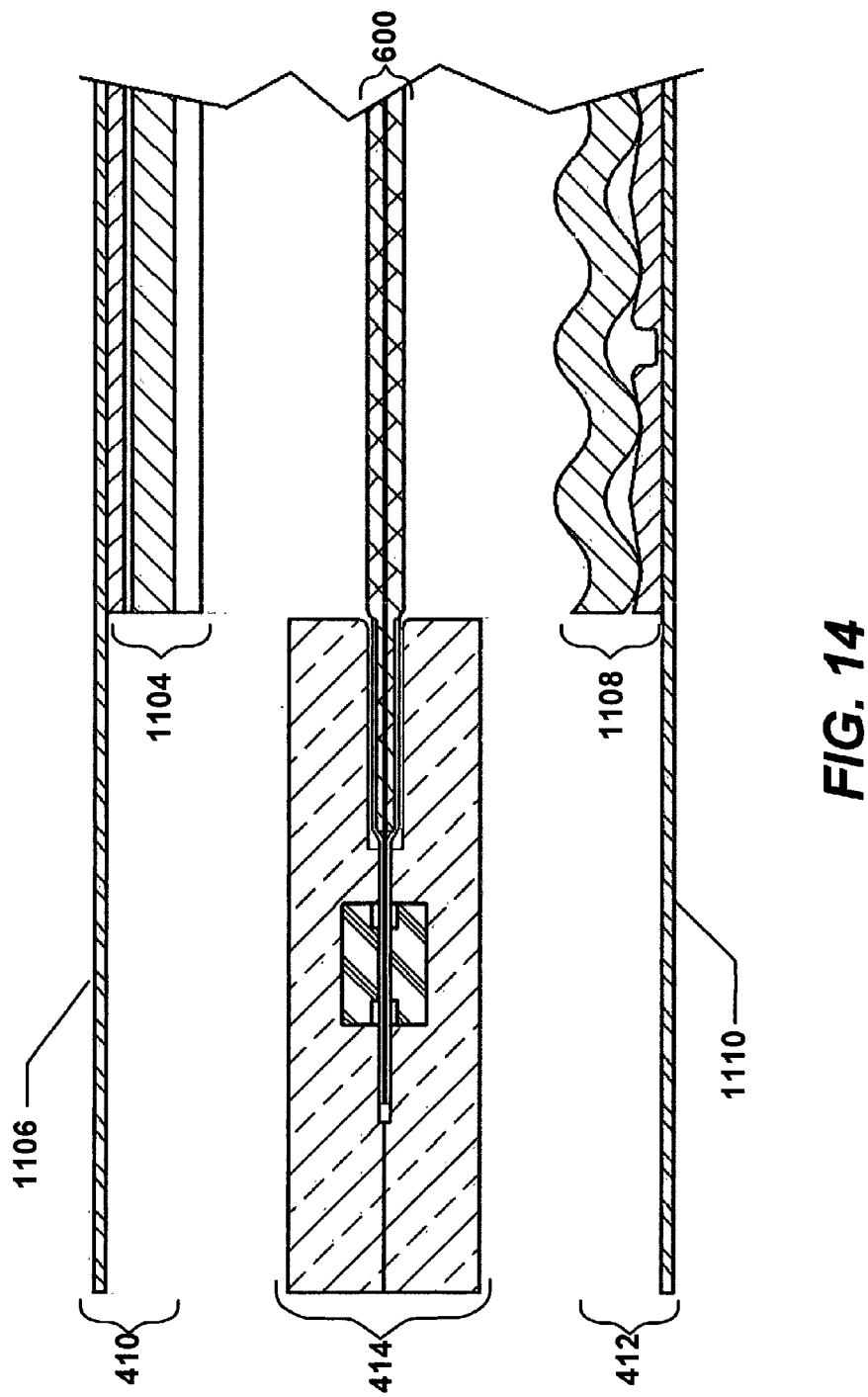
FIG. 14 is a partial expanded view of a unitized MEA assembly shown in relation to neighboring flow field/separator plate assemblies.

FIG. 14 is a partial expanded view of a unitized MEA assembly 414 shown in relationship to anode and cathode flow field/separator plate assemblies 410 and 412. When assembled together in a cell or stack, the unitized MEA assembly 414 provides a discrete, defined height limiter to separator plates 1106 and 1110. Once the separator plates are in full contact with the unitized MEA assembly, incremental additional clamping pressure, within reasonable manufacturing limits, will have negligible effect on the interior cell cavity height.

If compound flow fields are used as the anode flow field and the cathode flow field, such compound flow fields share the interior cell cavity height, effective overall height 414, with MEA 600. Through variation of the mechanical characteristics of the compound flow field, a specific force loading of the compound flow fields to the MEA can be designed using spring element methodologies that provide not only a substantially uniform force per area at a specific height but also provides compensation for manufacturing tolerances within the designed spring rate of the flow fields. What is more, due to the elastic compliance of the entire flow field area, discrete variations in both the static and dynamic thickness of the MEA can be accommodated without causing undue localized stresses.

Pressure is a function of the mechanical properties of the reticulated structure of the flow field and flow field base raw material, the variable geometry and densities imposed in the flow field manufacturing die forming operation and the mechanical characteristics of the MEA. The resulting pressure distribution and gradient allows a preferred current density and low resistance interface at an average of about 2 to 4 kg/cm$^2$ loading.

The present invention, therefore, is well adapted to carry out the objectives and attain both the ends and the advantages mentioned, as well as other benefits inherent therein. While the present invention has been depicted, described, and is defined by reference to particular embodiments of the invention, such references do not imply a limitation to the invention, and no such limitation is to be inferred. The invention is capable of considerable modification, alteration, and equivalents in form and/or functions, as will occur to those of ordinary skill in the pertinent arts. The depicted and described embodiments of the invention are exemplary only, and are not exhaustive of the scope of the present invention. Consequently, the present invention is intended to be limited only by the spirit and scope of the appended claims, giving full cognizance to equivalents in all respects.

What is claimed is:

1. A fuel cell stack comprising:
   (a) a first end plate and a second end plate, the second end plate being aligned with the first end plate;
   (b) a plurality of fuel cells interposed between the first and second end plates, at least one of the fuel cells comprising:
      (i) a cantilevered unitized MEA assembly, the cantilevered unitized MEA assembly comprising an MEA and a frame, the MEA being sealed within the frame,
      (ii) an anode flow field,
      (iii) a cathode flow field, and
      (iv) wherein the anode flow field comprises a primary flow field and a mating flow field, wherein the primary flow field includes a plurality of valleys and the mating flow field includes a plurality of recessed areas corresponding to respective ones of the valleys to form a plurality of microchannels;
   (c) a plurality of internal foils, each internal foil having an first connection surface and a second connection surface; and
   (d) a compression means, the compression means securing the end plates, the plurality of fuel cells, and the plurality of internal foils to form the fuel cell stack.

2. The fuel cell stack according to claim 1 wherein the first connection surface of a first internal foil is juxtaposed to the anode flow field of a first fuel cell, and the second connection surface of the first internal foil is juxtaposed to the cathode flow field of a second fuel cell.

3. The fuel cell stack according to claim 1 wherein the first connection surface of a first internal foil is juxtaposed to the anode flow field of a first fuel cell and the second connection surface of the first internal foil is juxtaposed to a heat exchange means, and wherein the first connection surface of a second internal foil is juxtaposed to the heat exchange means and the second connection surface of the second internal foil is juxtaposed to the cathode flow field of a second fuel cell.

4. The fuel cell stack according to claim 1 wherein the cathode flow field comprises a primary flow field and a mating flow field.

5. The fuel cell stack according to claim 1 wherein the anode flow field or the cathode flow field comprises a reticulated structure.

6. The fuel cell stack according to claim 1 wherein the anode flow field or the cathode flow field have a plurality of corrugations.

7. The fuel cell stack according to claim 6 wherein a first subset of corrugations are substantially located in a first plane, a second subset of corrugations are substantially located in a second plane, the first plane is substantially parallel to the second plane, and neighboring corrugations belong to different subsets.

8. The fuel cell stack according to claim 1 wherein the first end plate and the second end plate are constructed primarily from a plastic material.

9. The fuel cell stack according to claim 1 wherein the first end plate or the second end plate are substantially circular, substantially rectangular, or substantially square.

10. The fuel cell stack according to claim 1 wherein the compression means comprises a threaded fastener.

11. The fuel cell stack according to claim 1 wherein the cantilevered unitized MEA assembly further comprises a sealing clamp.

12. The fuel cell stack according to claim 1 wherein the frame of the unitized MEA comprises orifices for use in conjunction with the compression means.

13. The fuel cell stack according to claim 1 wherein the frame of the unitized MEA further comprises apertures substantially identical to apertures of the first end plate or second end plate for use in conjunction with the compression means.

14. A fuel cell stack comprising:
   (a) a first end plate and a second end plate, the second end plate being aligned with the first end plate;
   (b) a plurality of fuel cells, the fuel cells being interposed between the first end plate and the second end plate, and at least one of the fuel cells comprising:

(i) at least one compound flow field including a primary flow field having a plurality of corrugations and a mating flow field including a plurality of recessed areas,
(ii) a second flow field,
(iii) an MEA, and
(iv) a frame;
(c) a plurality of internal foils, each internal foil having an first connection surface and a second connection surface; and
(d) a compression means, the compression means securing the end plates, the plurality of fuel cells, and the plurality of the internal foils together.

15. The fuel cell stack according to claim 14 wherein the compound flow field comprises the an anode flow field of the fuel cell.

16. The fuel cell stack according to claim 14 wherein the compound flow field comprises a cathode flow field of the fuel cell.

17. The fuel cell stack according to claim 14 wherein the second flow field is a compound flow field.

18. The fuel cell stack according to claim 14 wherein the frame and the MEA form a unitized MEA assembly.

19. The fuel cell stack according to claim 15 wherein the first connection surface of a first internal foil is juxtaposed to the compound anode flow field of a first fuel cell, and the second connection surface of the first internal foil is juxtaposed to the second flow field of a second fuel cell.

20. The fuel cell stack according to claim 14 wherein the first connection surface of a first internal foil is juxtaposed to the compound flow field of a first fuel cell and the second connection surface of the first internal foil is juxtaposed to a heat exchange means, and wherein the first connection surface of a second internal foil is juxtaposed to the heat exchange means and the second connection surface of the second internal foil is juxtaposed to the second flow field of a second fuel cell.

21. The fuel cell stack according to claim 14 wherein the first connection surface of a first internal foil is juxtaposed to the second flow field of a first fuel cell and the second connection surface of the first internal foil is juxtaposed to a heat exchange means, and wherein the first connection surface of a second internal foil is juxtaposed to the heat exchange means and the second connection surface of the second internal foil is juxtaposed to the compound flow field of a second fuel cell.

22. The fuel cell stack according to claim 14 wherein the first end plate or the second end plate are constructed primarily from a plastic material.

23. The fuel cell stack according to claim 14 wherein the first end plate or the second end plate are substantially circular, substantially rectangular, or substantially square.

24. The fuel cell stack according to claim 14 wherein the compression means comprises threaded fastener.

25. A fuel cell stack comprising:
(a) a first end plate and a second end plate, the second end plate being aligned with the first end plate;
(b) a plurality of fuel cells, the fuel cells being interposed between the first end plate and the second end plate, and at least one of the fuel cells comprising:
(i) a first compound flow field,
(ii) a second compound flow field,
(iii) a unitized MEA assembly, the unitized MEA assembly comprising an MEA and a frame, the MEA being sealed within the frame; and
(iv) wherein each of the first and second compound flow fields include primary and mating flow fields, the primary flow field being corrugated and having a plurality of valleys, the mating flow fields including a plurality of recessed areas corresponding to respective ones of the valleys to form a plurality of microchannels, the mating flow fields further including at least one positioning peak operable to position the primary flow field with respect to the mating flow field;
(c) a plurality of internal foils, each internal foil having an first connection surface and a second connection surface; and
(d) a compression means, the compression means securing the end plates, the plurality of fuel cells, and the plurality of internal foils together.

26. The fuel cell stack according to claim 25 wherein the first compound flow field is an anode flow field of the fuel cell, and the second compound flow field is a cathode flow field of the fuel cell.

27. The fuel cell stack according to claim 26 wherein the first connection surface of a first internal foil is juxtaposed to the compound anode flow field of a first fuel cell, and the second connection surface of the first internal foil is juxtaposed to the second compound flow field of a second fuel cell.

28. The fuel cell stack according to claim 25 wherein the first connection surface of a first internal foil is juxtaposed to the first compound flow field of a first fuel cell and the second connection surface of the first internal foil is juxtaposed to a heat exchange means, and wherein the first connection surface of a second internal foil is juxtaposed to the heat exchange means and the second connection surface of the second internal foil is juxtaposed to the second compound flow field of a second fuel cell.

29. The fuel cell stack according to claim 25 wherein the first connection surface of a first internal foil is juxtaposed to the second compound flow field of a first fuel cell and the second connection surface of the first internal foil is juxtaposed to a heat exchange means, and wherein the first connection surface of a second internal foil is juxtaposed to the heat exchange means and the second connection surface of the second internal foil is juxtaposed to the first compound flow field of a second fuel cell.

30. The fuel cell stack according to claim 25 wherein a first subset of corrugations are substantially located in a first plane, a second subset of corrugations are substantially located in a second plane, the first plane is substantially parallel to the second plane, and neighboring corrugations belong to different subsets.

31. The fuel cell stack according to claim 25 wherein the first end plate and the second end plate are constructed primarily from a plastic material.

32. The fuel cell stack according to claim 25 wherein the first end plate or the second end plate are substantially circular, substantially rectangular, or substantially square.

33. The fuel cell stack according to claim 25 wherein the compression means comprises a threaded fastener.

34. The fuel cell stack according to claim 25 wherein the unitized MEA assembly is a cantilevered unitized MEA assembly.

35. The fuel cell stack according to claim 34 wherein the cantilevered unitized MEA assembly further comprises a sealing clamp.

36. The fuel cell stack according to claim 25 wherein the unitized MEA assembly is a sandwich unitized MEA assembly.

* * * * *